United States Patent
Chen et al.

(10) Patent No.: US 10,123,344 B2
(45) Date of Patent: Nov. 6, 2018

(54) METHODS AND APPARATUS FOR MULTI-SUBFRAME SCHEDULING

(71) Applicant: QUALCOMM Incorporated, San Diego, CA (US)

(72) Inventors: Wanshi Chen, San Diego, CA (US); Tao Luo, San Diego, CA (US); Peter Gaal, San Diego, CA (US); Aleksandar Damnjanovic, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 274 days.

(21) Appl. No.: 14/163,874

(22) Filed: Jan. 24, 2014

(65) Prior Publication Data

US 2014/0254509 A1    Sep. 11, 2014

Related U.S. Application Data

(60) Provisional application No. 61/773,626, filed on Mar. 6, 2013.

(51) Int. Cl.
| | | |
|---|---|---|
| *H04W 72/12* | (2009.01) | |
| *H04L 5/00* | (2006.01) | |
| *H04L 1/00* | (2006.01) | |

(52) U.S. Cl.
CPC .......... *H04W 72/12* (2013.01); *H04L 5/0058* (2013.01); *H04W 72/1205* (2013.01);
(Continued)

(58) Field of Classification Search
CPC .............................. H04L 5/0058; H04W 72/12
See application file for complete search history.

(56) References Cited

U.S. PATENT DOCUMENTS

| | | | | |
|---|---|---|---|---|
| 2009/0268693 | A1* | 10/2009 | Lindh et al. | 370/336 |
| 2010/0034139 | A1* | 2/2010 | Love et al. | 370/328 |

(Continued)

FOREIGN PATENT DOCUMENTS

| | | |
|---|---|---|
| CN | 102150467 A | 8/2011 |
| CN | 102202408 A | 9/2011 |

(Continued)

OTHER PUBLICATIONS

IPEA/EPO, Second Written Opinion of the International Preliminary Examining Authority, Int'l App. No. PCT/US2014/014789, dated Mar. 27, 2015, European Patent Office, Berlin, DE, 8 pgs.

(Continued)

*Primary Examiner* — Hashim S Bhatti
(74) *Attorney, Agent, or Firm* — Holland & Hart LLP

(57) ABSTRACT

Methods, systems, and devices are described for scheduling transmissions for multiple subframes in a single scheduling operation. Scheduling information is provided in a multi-subframe scheduling information transmission for a set of subframes. Differences in characteristics for subframes under the multi-subframe information are determined, and one or more properties for communication during the one or more subframes may be adjusted based on subframe characteristics. Such multi-subframe scheduling may allow for reduced overhead for scheduling uplink or downlink transmissions.

30 Claims, 16 Drawing Sheets

(52) U.S. Cl.
CPC .......... *H04L 1/0003* (2013.01); *H04L 1/0007* (2013.01); *H04L 1/0009* (2013.01); *H04W 72/1289* (2013.01)

(56) References Cited

U.S. PATENT DOCUMENTS

| | | | |
|---|---|---|---|
| 2010/0290419 A1* | 11/2010 | Wengerter | 370/329 |
| 2011/0090808 A1* | 4/2011 | Chen et al. | 370/252 |
| 2011/0223924 A1* | 9/2011 | Lohr et al. | 455/450 |
| 2011/0252139 A1* | 10/2011 | Bhattad et al. | 709/226 |
| 2012/0063413 A1* | 3/2012 | Kroener et al. | 370/330 |
| 2012/0127938 A1 | 5/2012 | Lv et al. | |
| 2012/0263047 A1* | 10/2012 | Love et al. | 370/252 |
| 2013/0016686 A1 | 1/2013 | Li et al. | |

FOREIGN PATENT DOCUMENTS

| | | | | |
|---|---|---|---|---|
| EP | 2434818 | A1 | 3/2012 | |
| EP | 2448347 | A1 | 5/2012 | |
| EP | 2509379 | A1 | 10/2012 | |
| EP | 2538734 | A1 * | 12/2012 | ............ H04W 72/00 |
| EP | 2538734 | A1 | 12/2012 | |
| WO | WO-2009022309 | A2 | 2/2009 | |
| WO | WO-2009126902 | A2 | 10/2009 | |
| WO | WO-2010045288 | A2 | 4/2010 | |
| WO | WO-2010133043 | A1 | 11/2010 | |
| WO | WO-2011053990 | A1 | 5/2011 | |
| WO | WO-2014098700 | A1 | 6/2014 | |
| WO | WO-2014098701 | A1 | 6/2014 | |

OTHER PUBLICATIONS

ISA/EPO, International Search Report and Written Opinion of the International Searching Authority, Int'l App. No. PCT/US2014/014789, dated Jul. 30, 2014, European Patent Office, Rijswijk, NL, 13 pgs.

HTC: "On Small Cell Enhancement for Improved Spectral Efficiency", 3GPP TSG-RAN WG1#72 R1-130311, Jan. 18, 2013, pp. 1-4, URL: http://www.3gpp.org/ftp/tsg_ran/WG1_RL1/TSGR1_72/Docs/R1-130311.zip.

QUALCOMM Incorporated., "Overhead Reduction", 3GPP Draft, 3GPP TSG RAN WG1 #72, R1-130594, Jan. 28, 2013-Feb. 1, 2013, Jan. 19, 2013 (Jan. 19, 2013), XP050663850, Retrieved from the Internet: URL: http://www.3gpp.org/ftp/tsg_ran/WG1_RL1/TSGR1_72/Docs/, 4 Pages.

ZTE: "Consideration in downlink control overhead reduction for small cell", 3GPP TSG-RAN WG1#72 R1-130137, Jan. 19, 2013, pp. 1-2, URL: http://www.3gpp.org/ftp/tsg_ran/WG1_RL1/TSGR1_72/Docs/R1-130137.zip.

* cited by examiner

METHODS AND APPARATUS FOR MULTI-SUBFRAME SCHEDULING

CROSS REFERENCES

The present Application for Patent claims priority to U.S. Provisional Patent Application No. 61/773,626 by Chen et al., entitled "Methods and Apparatus for Multi-Subframe Scheduling," filed Mar. 6, 2013, assigned to the assignee hereof, and expressly incorporated by reference herein.

BACKGROUND

The following relates generally to wireless communication, and more specifically to multi-subframe scheduling in a wireless communication system. Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

Generally, a wireless multiple-access communications system may include a number of eNBs, each simultaneously supporting communication for multiple mobile devices. eNBs may communicate with mobile devices on downstream and upstream links. Each eNB has a coverage range, which may be referred to as the coverage area of the cell. Transmissions between a mobile device and an eNB are generally performed according to scheduled transmissions between the eNB and the mobile device. An eNB may transmit scheduling information to the mobile device that indicated information related to a scheduled uplink transmission from the mobile device to the eNB, or a scheduled downlink transmission from the eNB to the mobile device. The mobile device may then operate according to the scheduled transmissions to send/receive communications to/from the eNB.

SUMMARY

The described features generally relate to one or more improved systems, methods, and/or apparatuses for scheduling transmissions for multiple subframes in a single scheduling operation. Scheduling information is provided in a multi-subframe scheduling information transmission for a set of subframes. Differences in characteristics for subframes under the multi-subframe information are determined, and one or more properties for communication during the one or more subframes may be adjusted based on subframe characteristics. Such multi-subframe scheduling may allow for reduced overhead for scheduling uplink or downlink transmissions.

According to some aspects, a method of wireless communication performed by a user equipment (UE) is provided. The method generally includes receiving, in a first subframe, multi-subframe scheduling information for a set of subframes, determining differences in characteristics for one or more subframes of the set of subframes based on the multi-subframe scheduling information, and adjusting one or more properties for communication during the one or more subframes responsive to the determination.

The differences in characteristics of one or more subframes may include, for example, one or more of: different available resource blocks (RBs) from the first subframe; a collision condition with at least one of a primary synchronization signal, a secondary synchronization signal, a primary broadcast channel, a common reference signal, a positioning reference signal, or a channel state information reference signal; a subframe type different from a subframe type of the first subframe, the type of subframe comprising at least one of a multicast broadcast single frequency network (MBSFN) downlink subframe, a non-MBSFN subframe, a special subframe, or an almost blank subframe; a type indication that disallows physical downlink shared channel (PDSCH) or physical uplink shared channel (PUSCH) transmission; or a semi-persistent scheduling (SPS) assignment. The adjusting of one or more properties for communication during the one or more may include, for example, adjusting one or more of: a transport block size (TBS) of the one or more subframes relative to a transport block size of the first subframe; a modulation and coding scheme (MCS) of the one or more subframes relative to a MCS of the first subframe; a rank of the one or more subframes relative to a rank of the first subframe; transmission resources based on a punctured demodulation reference signal (DM-RS) pattern; or a scheduling of resources so as to skip scheduling of resources of the one or more subframes.

According to some examples, determining differences in characteristics for one or more subframes of the set of subframes may include determining that a second subframe has a different number of available resource elements (REs) for transmission from the first subframe, and the adjusting in such examples may include adjusting a transport block size (TBS) of the second subframe based at least in part on the number of available REs of the second subframe. In some examples, adjusting the TBS comprises scaling the TBS of the second subframe based at least in part on a modulation and coding scheme (MCS) and a ratio of the number of available REs of the second subframe and a number of available REs of the first subframe. Additionally or alternatively, adjusting the TBS may include scaling the TBS of the second subframe based at least in part on the TBS of the first subframe and a ratio of the number of available REs of the second subframe and a number of available REs of the first subframe.

According to some further examples, determining differences in characteristics for one or more subframes of the set of subframes may include determining that a number of available resource blocks (RBs) for a second subframe is different from the number of available RBs for the first subframe, and in such examples the adjusting may include adjusting a resource allocation associated with the second subframe. In some examples, such determining may include determining that a primary synchronization signal (PSS) or a secondary synchronization signal (SSS) is to be transmitted in the second subframe, and determining a first set of RBs in the second subframe to be used for the PSS or SSS and a second set of RBs in the second subframe, the second set of RBs including RBs other than RBs included in the first set. In such examples, the adjusting may include scheduling the second set of RBs for transmission in the second subframe. According to still further examples, the determining may include determining that a second subframe has a semi-persistently scheduled transmission, and the adjusting in such examples may include skipping a scheduling of resources associated with the multi-subframe scheduling information for the second subframe. In other examples, the determining may include determining that a second subframe has a semi-persistently scheduled transmission, and in such examples the adjusting may include skipping the semi-persistently scheduled transmission for the second subframe and scheduling resources associated with the multi-subframe scheduling information for the second subframe.

The method may also include, in some examples, processing subframe coding for each subframe of the set of subframes responsive to the adjusting. The method may also include, in some examples, receiving different scheduling information subsequent to receiving the multi-subframe scheduling information, the different scheduling information being for at least one of the set of subframes, and replacing the multi-subframe scheduling information with the different scheduling information. According to further examples, the method may also include ignoring scheduling information for the set of subframes that is received after the receipt of the multi-subframe scheduling information. The communication may include receiving at least one downlink transmission from an eNB in a subframe, and/or transmitting at least one channel to an eNB in a subframe.

According to other aspects, a user equipment apparatus for wireless communication is provided. The apparatus generally includes means for receiving, in a first subframe, multi-subframe scheduling information for a set of subframes, means for determining differences in characteristics for one or more subframes of the set of subframes based on the multi-subframe scheduling information, and means for adjusting one or more properties for communication during the one or more subframes responsive to the determination.

According to some examples, the means for determining the differences in characteristics may include means for determining that at least one subframe of the set of subframes has one or more of: different available resource blocks (RBs) from the first subframe; a collision condition with at least one of a primary synchronization signal, a secondary synchronization signal, a primary broadcast channel, a common reference signal, a positioning reference signal, or a channel state information reference signal; a subframe type different from a subframe type of the first subframe, the type of subframe comprising at least one of a multicast broadcast single frequency network (MBSFN) downlink subframe, a non-MBSFN subframe, a special subframe, or an almost blank subframe; a type indication that disallows physical downlink shared channel (PDSCH) or physical uplink shared channel (PUSCH) transmission; or a semi-persistent scheduling (SPS) assignment. The means for adjusting one or more properties for communication during the one or more subframes may include, for example, means for adjusting one or more of: a transport block size (TBS) of the one or more subframes relative to a transport block size of the first subframe; a modulation and coding scheme (MCS) of the one or more subframes relative to a MCS of the first subframe; a rank of the one or more subframes relative to a rank of the first subframe; transmission resources based on a punctured demodulation reference signal (DM-RS) pattern; or a scheduling of resources so as to skip scheduling of resources of the one or more subframes.

In some examples, the means for determining may include means for determining that a second subframe has a different number of available resource elements (REs) for transmission from the first subframe, and the means for adjusting in such examples may include means for adjusting a transport block size (TBS) of the second subframe based at least in part on the number of available REs of the second subframe. The means for adjusting the TBS may include, for example, means for scaling the TBS of the second subframe based at least in part on a modulation and coding scheme (MCS) and a ratio of the number of available REs of the second subframe and a number of available REs of the first subframe, and/or means for scaling the TBS of the second subframe based at least in part on the TBS of the first subframe and a ratio of the number of available REs of the second subframe and a number of available REs of the first subframe.

In some examples, the means for determining may include means for determining that a number of available resource blocks (RBs) for a second subframe is different from the number of available RBs for the first subframe, and the means for adjusting in such examples may include means for adjusting a resource allocation associated with the second subframe. In further examples, the means for determining may include means for determining that a primary synchronization signal (PSS) or a secondary synchronization signal (SSS) is to be transmitted in the second subframe, and means for determining a first set of RBs in the second subframe to be used for the PSS or SSS and a second set of RBs in the second subframe, the second set of RBs including RBs other than RBs included in the first set. The means for adjusting in such examples may include means for scheduling the second set of RBs for transmission in the second subframe.

In further examples, the means for determining may include means for determining that a second subframe has a semi-persistently scheduled transmission, and the means for adjusting in such examples may include means for skipping a scheduling of resources associated with the multi-subframe scheduling information for the second subframe. In other examples, the means for determining may include means for determining that a second subframe has a semi-persistently scheduled transmission, and the means for adjusting in such examples may include means for skipping the semi-persistently scheduled transmission for the second subframe and scheduling resources associated with the multi-subframe scheduling information for the second subframe.

In still further examples, the apparatus may further include means for processing subframe coding for each subframe of the set of subframes responsive to the adjusting. The apparatus may also include, in some example, means for receiving different scheduling information subsequent to receiving the multi-subframe scheduling information, the different scheduling information being for at least one of the set of subframes, and means for replacing the multi-subframe scheduling information with the different scheduling information. Additionally or alternatively, the apparatus may include means for ignoring scheduling information for the set of subframes that is received after the receipt of the multi-subframe scheduling information. In some examples, the communication may include receiving at least one downlink transmission from an eNB in a subframe and/or transmitting at least one channel to an eNB in a subframe.

According to other aspects, a wireless communication user equipment apparatus is provided. The apparatus generally includes at least one processor and a memory coupled with the processor. The processor may be configured to receive, in a first subframe, multi-subframe scheduling information for a set of subframes, determine differences in characteristics for one or more subframes of the set of subframes based on the multi-subframe scheduling information, and adjust one or more properties for communication during the one or more subframes responsive to the determination. According to some examples, the processor may be further configured to determine that at least one subframe of the set of subframes has one or more of: different available resource blocks (RBs) from the first subframe; a collision condition with at least one of a primary synchronization signal, a secondary synchronization signal, a primary broadcast channel, a common reference signal, a positioning reference signal, or a channel state information reference signal; a subframe type different from a subframe type of the first subframe, the type of subframe comprising at least one of a multicast broadcast single frequency network (MBSFN) downlink subframe, a non-MBSFN subframe, a special subframe, or an almost blank subframe; a type indication that disallows physical downlink shared channel (PDSCH) or physical uplink shared channel (PUSCH) transmission; or a semi-persistent scheduling (SPS) assignment. According to some other examples, the processor may be further configured to adjust one or more of: a transport block size (TBS) of the one or more subframes relative to a transport block size of the first subframe; a modulation and coding scheme (MCS) of the one or more subframes relative to a MCS of the first subframe; a rank of the one or more subframes relative to a rank of the first subframe; transmission resources based on a punctured demodulation reference signal (DM-RS) pattern; or a scheduling of resources so as to skip scheduling of resources of the one or more subframes.

According to further aspects, a computer program product for wireless communications by a user equipment is provided. The computer program product may include a non-transitory computer-readable medium comprising code for receiving, in a first subframe, multi-subframe scheduling information for a set of subframes, code for determining differences in characteristics for one or more subframes of the set of subframes based on the multi-subframe scheduling information, and code for adjusting one or more properties for communication during the one or more subframes responsive to the determination. In some examples, the code for determining the differences in characteristics may include code for determining that at least one subframe of the set of subframes has one or more of: different available resource blocks (RBs) from the first subframe; a collision condition with at least one of a primary synchronization signal, a secondary synchronization signal, a primary broadcast channel, a common reference signal, a positioning reference signal, or a channel state information reference signal; a subframe type different from a subframe type of the first subframe, the type of subframe comprising at least one of a multicast broadcast single frequency network (MBSFN) downlink subframe, a non-MBSFN subframe, a special subframe, or an almost blank subframe; a type indication that disallows physical downlink shared channel (PDSCH) or physical uplink shared channel (PUSCH) transmission; or a semi-persistent scheduling (SPS) assignment. According to other examples, the code for adjusting one or more properties for communication during the one or more subframes comprises code for adjusting one or more of: a transport block size (TBS) of the one or more subframes relative to a transport block size of the first subframe; a modulation and coding scheme (MCS) of the one or more subframes relative to a MCS of the first subframe; a rank of the one or more subframes relative to a rank of the first subframe; transmission resources based on a punctured demodulation reference signal (DM-RS) pattern; or a scheduling of resources so as to skip scheduling of resources of the one or more subframes.

In still further aspects, a method of wireless communication performed by a node in communication with a user equipment (UE) is provided. The node may be an eNB, a different UE, or another kind of wireless node. The method generally includes determining differences in characteristics for one or more subframes of a set of subframes associated with a multi-subframe scheduling assignment, adjusting multi-subframe scheduling information for the set of subframes based on the differences, and transmitting the multi-subframe scheduling information to a UE. According to some examples, determining the differences in characteristics may include determining that at least one subframe of the set of subframes has one or more of: different available resource blocks (RBs) from the first subframe; a collision condition with at least one of a primary synchronization signal, a secondary synchronization signal, a primary broadcast channel, a common reference signal, a positioning reference signal, or a channel state information reference signal; a subframe type that is different from a subframe type of the first subframe, the subframe type comprising at least one of a multicast broadcast single frequency network (MBSFN) downlink subframe, a non-MBSFN subframe, a special subframe, or an almost blank subframe; a type indication that disallows physical downlink shared channel (PDSCH) or physical uplink shared channel (PUSCH) transmission; or a semi-persistent scheduling (SPS) assignment. In some examples, adjusting scheduling information for the one or more subframes of the set of subframes may include adjusting one or more of: a transport block size (TBS) of the one or more subframes relative to a transport block size of the first subframe; a modulation and coding scheme (MCS) of the one or more subframes relative to a MCS of the first subframe; a rank of the one or more subframes relative to a rank of the first subframe; transmission resources based on a punctured demodulation reference signal (DM-RS) pattern; or scheduling of resources so as to skip scheduling of resources for the one or more subframes.

According to some examples, the determining may include identifying one of the set of subframes having a different number of available resource elements from other subframes of the set of subframes, and the adjusting in such examples may include adjusting a transport block size (TBS) of the identified subframe based at least in part on the number of available resource elements of the identified subframe. In other examples, the determining may include identifying that a number of available resource blocks (RBs) for one of the set of subframes is different from the number of available RBs for one or more other subframes of the set of subframes, and the adjusting in such examples may include adjusting a resource allocation associated with the identified subframe. In other examples, the determining comprises identifying one or more subframes of the set of subframes having a semi-persistently scheduled transmission, and the adjusting in such examples may include skipping a scheduling of resources associated with the multi-subframe scheduling information for the one or more identified subframes. In still other examples, the determining may include identifying one or more subframes of the set of subframes having a semi-persistently scheduled transmission, and the adjusting in such examples may include skipping the semi-persistently scheduled transmission and scheduling resources associated with the multi-subframe scheduling information for the one or more identified subframes.

Further scope of the applicability of the described methods and apparatuses will become apparent from the following detailed description, claims, and drawings. The detailed description and specific examples are given by way of illustration only, since various changes and modifications within the spirit and scope of the description will become apparent to those skilled in the art.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
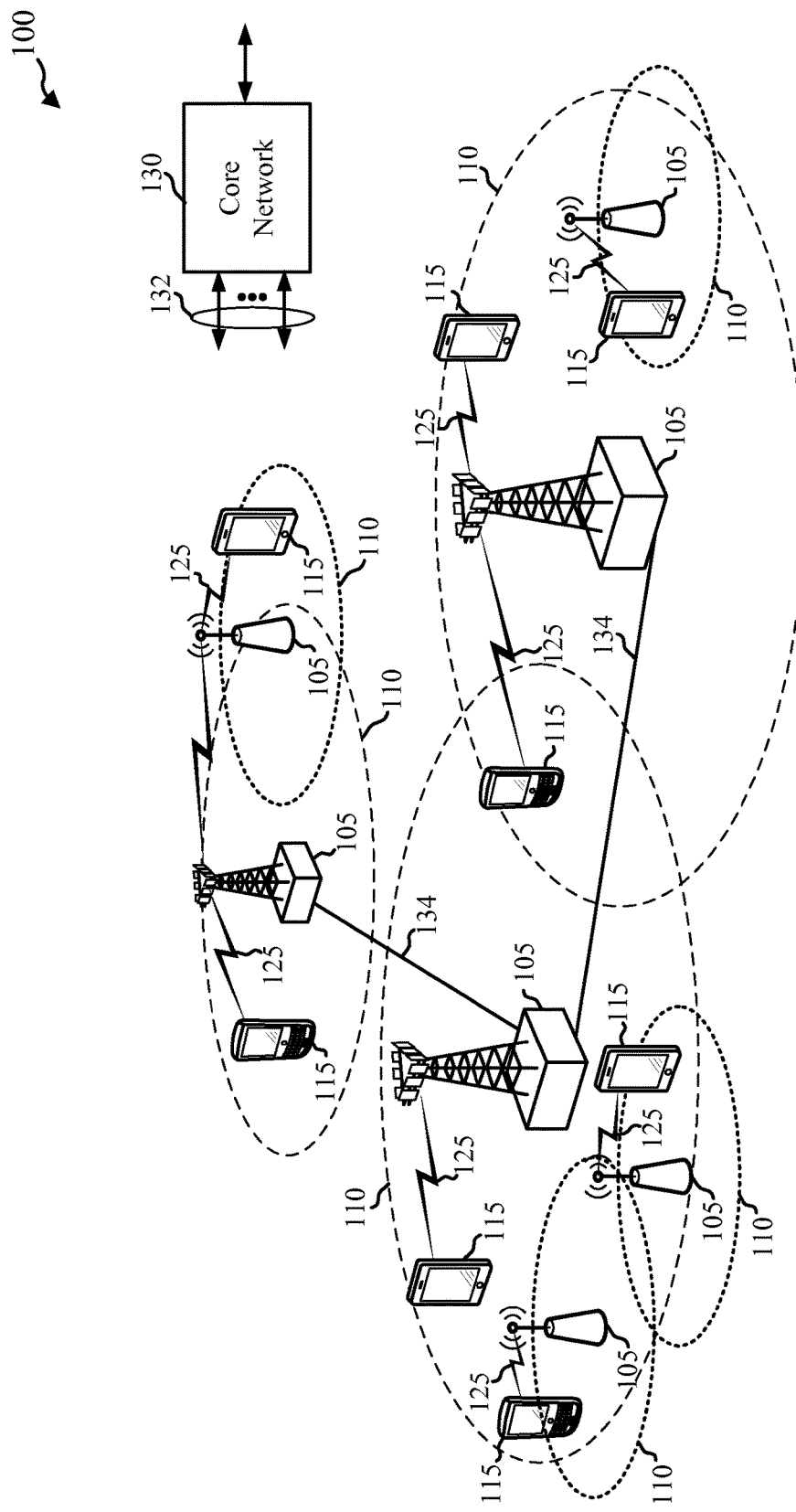
FIG. 1 shows a block diagram of a wireless communications system.

Various aspects of the disclosure provide for scheduling transmissions for multiple subframes in a single scheduling operation. Scheduling information is provided in a multi-subframe scheduling information transmission for a set of subframes. Differences in characteristics for subframes under the multi-subframe information are determined, and one or more properties for communication during the one or more subframes may be adjusted based on subframe characteristics. Such multi-subframe scheduling may allow for reduced overhead for scheduling uplink or downlink transmissions.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. For example, techniques described herein may be applied to LTE or LTE-A transmissions in a shared or unlicensed spectrum. Techniques described herein may also be applied to Machine Type Communications (MTC) or Machine-to-Machine (M2M) communications. The description below, however, describes an LTE system for purposes of example, and LTE terminology is used in much of the description below, although the techniques are applicable beyond LTE applications.

Thus, the following description provides examples, and is not limiting of the scope, applicability, or configuration set forth in the claims. Changes may be made in the function and arrangement of elements discussed without departing from the spirit and scope of the disclosure. Various examples may omit, substitute, or add various procedures or components as appropriate. For instance, the methods described may be performed in an order different from that described, and various steps may be added, omitted, or combined. Also, features described with respect to certain examples may be combined in other examples.

Referring first to FIG. 1, a diagram illustrates an example of a wireless communications system 100. The wireless communications system 100 includes eNodeBs (eNBs) (or cells) 105, user equipment (UEs) 115, and a core network 130. The eNBs 105 may communicate with the UEs 115 under the control of a base station controller (not shown), which may be part of the core network 130 or the eNBs 105 in various examples. The eNBs 105 may communicate control information and/or user data with the core network 130 through backhaul links 132. Backhaul links may be wired backhaul links (e.g., copper, fiber, etc.) and/or wireless backhaul links (e.g., microwave, etc.). In examples, the eNBs 105 may communicate, either directly or indirectly, with each other over backhaul links 134, which may be wired or wireless communication links. The wireless communications system 100 may support operation on multiple carriers (waveform signals of different frequencies). Multi-carrier transmitters can transmit modulated signals simultaneously on the multiple carriers. For example, each communication link 125 may be a multi-carrier signal modulated according to the various radio technologies described above. Each modulated signal may be sent on a different carrier and may carry control information (e.g., reference signals, control channels, etc.), overhead information, data, etc.

The eNBs 105 may wirelessly communicate with the UEs 115 via one or more eNB antennas. Each of the eNB 105 sites may provide communication coverage for a respective geographic area 110. In some examples, an eNB 105 may be referred to as a base station, a base transceiver station, a radio base station, an access point, a radio transceiver, a basic service set (BSS), an extended service set (ESS), a NodeB, Home NodeB, a Home eNodeB, or some other suitable terminology. The geographic area 110 for an eNB may be divided into sectors making up only a portion of the coverage area (not shown). The wireless communications system 100 may include eNBs 105 of different types (e.g., macro, micro, and/or pico base stations). There may be overlapping coverage areas for different technologies.

The wireless communications system 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. In examples, some eNBs 105 may be synchronous while other eNBs may be asynchronous.

The UEs 115 are dispersed throughout the wireless communications system 100, and each device may be stationary or mobile. A UE 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a user equipment, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A communication device may be able to communicate with macro base stations, pico base stations, femto base stations, relay base stations, and the like.

The communication links 125 shown in the wireless communications system 100 may include uplink (UL) transmissions from a UE 115 to an eNB 105, and/or downlink (DL) transmissions, from an eNB 105 to a UE 115. The downlink transmissions may also be called forward link transmissions while the uplink transmissions may also be called reverse link transmissions. In examples, the communication links 125 may be FDD or TDD carriers carrying bidirectional traffic within traffic frames. Data traffic may be transmitted between eNB 105 and UE 115. A basic unit of resource for the air interface used to transmit data is a resource block (RB). The eNB 105 may include a scheduler that allocates RBs to a UE 115 for data transfer. RBs may be arranged to provide a number of frames of data, and associated subframes, with each associated subframe having a number of resource elements (REs). Various aspects of the present disclosure provide that multiple subframes may be scheduled with a single scheduling transmission, potentially reducing signaling overhead associated with scheduling resources significantly, as will be described in more detail below.

In examples, the wireless communications system 100 is an LTE/LTE-A network. The wireless communications system 100 may be a Heterogeneous LTE/LTE-A network in which different types of eNBs provide coverage for various geographical regions. For example, each eNB 105 may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. An eNB may support one or multiple (e.g., two, three, four, and the like) cells. In certain examples, the eNBs may communicate with the UEs 115 or each other over a licensed spectrum. Additionally or alternatively, the eNBs may communicate with the UE 115 or each other over a shared or unlicensed spectrum. In additional examples, the wireless communications system 100 may provide for the communication of Machine Type Communications (MTC) or Machine-to-Machine (M2M) communications between one or more machine type devices.

The wireless communications system 100 according to an LTE/LTE-A network architecture may be referred to as an Evolved Packet System (EPS). The EPS may include one or more UEs 115, an Evolved UMTS Terrestrial Radio Access Network (E-UTRAN), an Evolved Packet Core (EPC) (e.g., core network 130), a Home Subscriber Server (HSS), and an Operator's IP Services. The EPS may interconnect with other access networks using other Radio Access Technologies. For example, EPS may interconnect with a UTRAN-based network and/or a CDMA-based network via one or more Serving GPRS Support Nodes (SGSNs). To support mobility of UEs 115 and/or load balancing, EPS may support handover of UEs 115 between a source eNB 105 and a target eNB 105. EPS may support intra-RAT handover between eNBs 105 and/or other base stations of the same RAT (e.g., other E-UTRAN networks), and inter-RAT handovers between eNBs and/or base stations of different RATs (e.g., E-UTRAN to CDMA, etc.). The EPS may provide packet-switched services, however, as those skilled in the art will readily appreciate, the various concepts presented throughout this disclosure may be extended to networks providing circuit-switched services.

The E-UTRAN may include the eNBs 105 and may provide user plane and control plane protocol terminations toward the UEs 115. The eNBs 105 may be connected to other eNBs 105 via backhaul link 134 (e.g., an X2 interface). The eNBs 105 may provide an access point to the EPC for the UEs 115. The eNBs 105 may be connected by backhaul link 132 (e.g., an S1 interface) to the EPC. Logical nodes within the EPC may include one or more Mobility Management Entities (MMES), one or more Serving Gateways, and one or more Packet Data Network (PDN) Gateways (not shown). Generally, the MME may provide bearer and connection management. All user IP packets may be transferred through the Serving Gateway, which itself may be connected to the PDN Gateway. The PDN Gateway may provide UE IP address allocation as well as other functions. The PDN Gateway may be connected to IP networks and/or the operator's IP Services. These logical nodes may be implemented in separate physical nodes or one or more may be combined in a single physical node. The IP Networks/Operator's IP Services may include the Internet, an Intranet, an IP Multimedia Subsystem (IMS), and/or a Packet-Switched (PS) Streaming Service (PSS).

The UEs 115 may be configured to collaboratively communicate with multiple eNBs 105 through, for example, Multiple Input Multiple Output (MIMO), Coordinated Multi-Point (CoMP), or other schemes. MIMO techniques use multiple antennas on the eNBs and/or multiple antennas on the UE to take advantage of multipath environments to transmit multiple data streams. CoMP includes techniques for dynamic coordination of transmission and reception by a number of eNBs to improve overall transmission quality for UEs as well as increasing network and spectrum utilization. Generally, CoMP techniques utilize backhaul links 132 and/or 134 for communication between eNBs 105 to coordinate control plane and user plane communications for the UEs 115.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid ARQ (HARQ) to provide retransmission at the MAC layer to improve link efficiency. In the control plane, the Radio Resource Control (RRC) protocol layer may provide establishment, configuration, and maintenance of an RRC connection between the UE and the network used for the user plane data. At the Physical layer, the transport channels may be mapped to Physical channels.

LTE/LTE-A utilizes orthogonal frequency division multiple-access (OFDMA) on the downlink and single-carrier frequency division multiple-access (SC-FDMA) on the uplink. OFDMA and SC-FDMA partition the system bandwidth into multiple (K) orthogonal subcarriers, which are also commonly referred to as tones, bins, or the like. Each subcarrier may be modulated with data. The spacing between adjacent subcarriers may be fixed, and the total number of subcarriers (K) may be dependent on the system bandwidth. For example, K may be equal to 72, 180, 300, 600, 900, or 1200 with a subcarrier spacing of 15 kilohertz (KHz) for a corresponding system bandwidth (with guard-band) of 1.4, 3, 5, 10, 15, or 20 megahertz (MHz), respectively. The system bandwidth may also be partitioned into sub-bands. For example, a sub-band may cover 1.08 MHz, and there may be 1, 2, 4, 8 or 16 sub-bands.

The wireless communications system 100 may support operation on multiple carriers, which may be referred to as carrier aggregation (CA) or multi-carrier operation. A carrier may also be referred to as a component carrier (CC), a channel, etc. The terms "carrier," "CC," and "channel" may be used interchangeably herein. A carrier used for the downlink may be referred to as a downlink CC, and a carrier used for the uplink may be referred to as an uplink CC. A UE may be configured with multiple downlink CCs and one or more uplink CCs for carrier aggregation. An eNB may transmit data and control information on one or more downlink CCs to the UE. The UE may transmit data and control information on one or more uplink CCs to the eNB.

An eNB 105 may include a scheduler that allocates resources to one or more UEs 115. Allocation of resources to a UE 115 may be signaled to the UE 115 using a physical downlink control channel (PDCCH) or physical uplink control channel (PUCCH), which specify physical downlink shared channel (PDSCH) or physical uplink shared channel (PUSCH) resources that are scheduled to the particular UE 115. A single downlink control channel may schedule a single PDSCH transmission in one subframe or a single PUSCH transmission in one subframe. Each such control channel scheduling transmission consumes certain resources, which may, in some implementations, be a significant amount of radio resources available for transmissions. For example, one control symbol having scheduling information for a PDCCH may result in a 7% overhead for normal carrier pairs in some LTE systems. In some systems, a distributed enhanced PDCCH (EPDCCH) may be used to transmit control information, and a control symbol having scheduling information may require two physical resource block (PRB) pairs in such a system, resulting in a 4% overhead in some implementations. Various aspects of the present disclosure provide that multiple subframes may be scheduled with a single scheduling transmission, potentially reducing such overhead significantly, For example, if four subframes are scheduled with a single control channel transmission, overhead related to scheduling transmissions may be reduced by as much as 75%.

Figure 2:
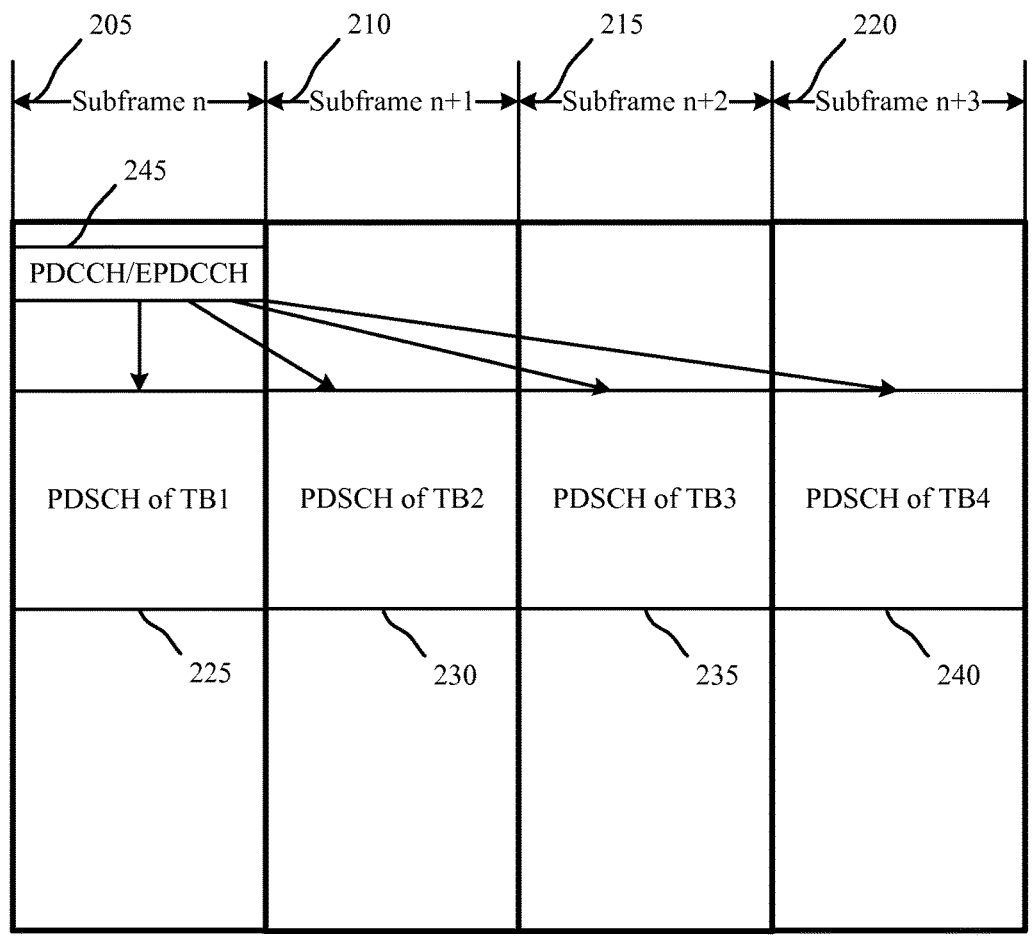
FIG. 2 shows a diagram of exemplary scheduling of multiple subframes in accordance with various examples.

With reference to FIG. 2, a diagram 200 illustrates multi-subframe scheduling according to various examples. In this diagram, four subframes 205-220 are illustrated, namely subframe n 205, subframe n+1 210, subframe n+2 215, and subframe n+3 220. Each subframe 205-220 includes corresponding PDSCH resources 225-240 that are allocated to the UE (e.g., UE 115 of FIG. 1). The scheduling for PDSCH resources 225-240, in some examples, is transmitted to the UE from an eNB (e.g., eNB 105 of FIG. 1) on control channel transmission 245. In this example, control channel transmission 245, which may be a PDCCH or EPDCCH transmission, may be used to schedule PDSCH of transport block 1 (TB1) 225 in subframe n 205, PDSCH of TB2 230 in subframe n+1 210, PDSCH of TB3 235 in subframe n+2 215, and PDSCH of TB4 240 in subframe n+3 220. Each of transport block TB1 through TB4, in some examples, are unique transport blocks, and not the same transport block repeated over multiple subframes. According to some examples, each of the subframes 205-220 may have different characteristics that may impact the available resources for the particular subframe, and the scheduled resources for the subframes 205-220 may be adjusted based on the different characteristics. While the examples of FIG. 2 are discussed with reference to downlink channels, it will be readily understood that the examples described would also be applicable to uplink channels.

Thus, a UE may receive, in subframe 205, multi-subframe scheduling information on the control channel transmission 245 for a set of subframes 205-220. The multi-subframe scheduling information may be received from, for example, an eNB, a different UE, and/or other types of wireless nodes. The UE may then determine differences in characteristics for one or more of the subframes 205-220, and adjust one or more properties for communication based on the differences. In some examples, a UE may receive scheduling information on the control channel transmission 245 that accounts for such differences, and in other examples the UE may receive scheduling information related to subframe n 205 and modify this scheduling information for subframes n+1 210 through subframe n+3 based on the determined characteristics of subframes 210-220, and differences from subframe n 205. Such differences may include, for example, different available resource blocks (RBs) in one or more of subframes 210-220 relative to RBs of subframe 205, disallowed PDSCH/PUSCH transmissions in one or more subframes 210-220, and punctured demodulation reference signal (DM-RS) patterns in one or more subframes 205-220.

Resource block (RB) availability may be impacted, for instance, if one of the subframes 205-220 is a special subframe where a reduced number of resources are available, such as a subframe that includes a channel state information reference signal (CSI-RS) or a positioning reference signal (PRS), for example. In such cases, the affected subframe will have some number of RBs that are unavailable for a PDSCH transmission, and thus scheduling information between subframe n and the affected subframe may not be the same. Differences between subframes 205-220 may also be present in the event of a collision condition between one or more of PDSCH resources 225-240 and at least one of a primary synchronization signal (PSS), a secondary synchronization signal (SSS), a physical broadcast channel (PBCH), or a common reference signal (CRS), for example, to be transmitted in one or more of subframes 205-220. Differences may also result in the event that one or more of subframes 210-220 are a type of subframe different from the subframe n 205, such as a multicast broadcast single frequency network (MBSFN) downlink subframe, a non-MBSFN subframe, a special subframe, or an almost blank subframe (ABS).

Furthermore, one or more of subframes 210-220 may be of a type that disallows PDSCH or PUSCH transmission. For example, for multimedia broadcast multicast service (MBMS) and measurement gap subframes, PUSCH and/or PDSCH transmissions are not supported, and in ABS subframes PDSCH transmission is not preferred. Furthermore, differences between subframes 205-220 may result from the presence or absence of a semi-persistent scheduling (SPS) assignment for a particular subframe 205-220. Additionally, as mentioned above, differences from subframes 205-220 may result from a punctured DM-RS pattern in a subframe. For example, in resource blocks where PSS or SSS are transmitted, some DM-RS resource elements may be punctured, such that reduced channel estimation performance is experienced and a reduced rank is supported in such subframes. In some examples, an unpunctured subframe would support a rank of 8 (e.g., up to 8 layers of encoded and modulated data transmitted to a UE), while a punctured subframe supports a maximum rank of 4. Processing of subframe coding for each subframe of the set of subframes 205-220 is performed based on any adjustments to one or more subframes, in order to ensure the subframes 205-220 are properly transmitted and received.

Figure 3:
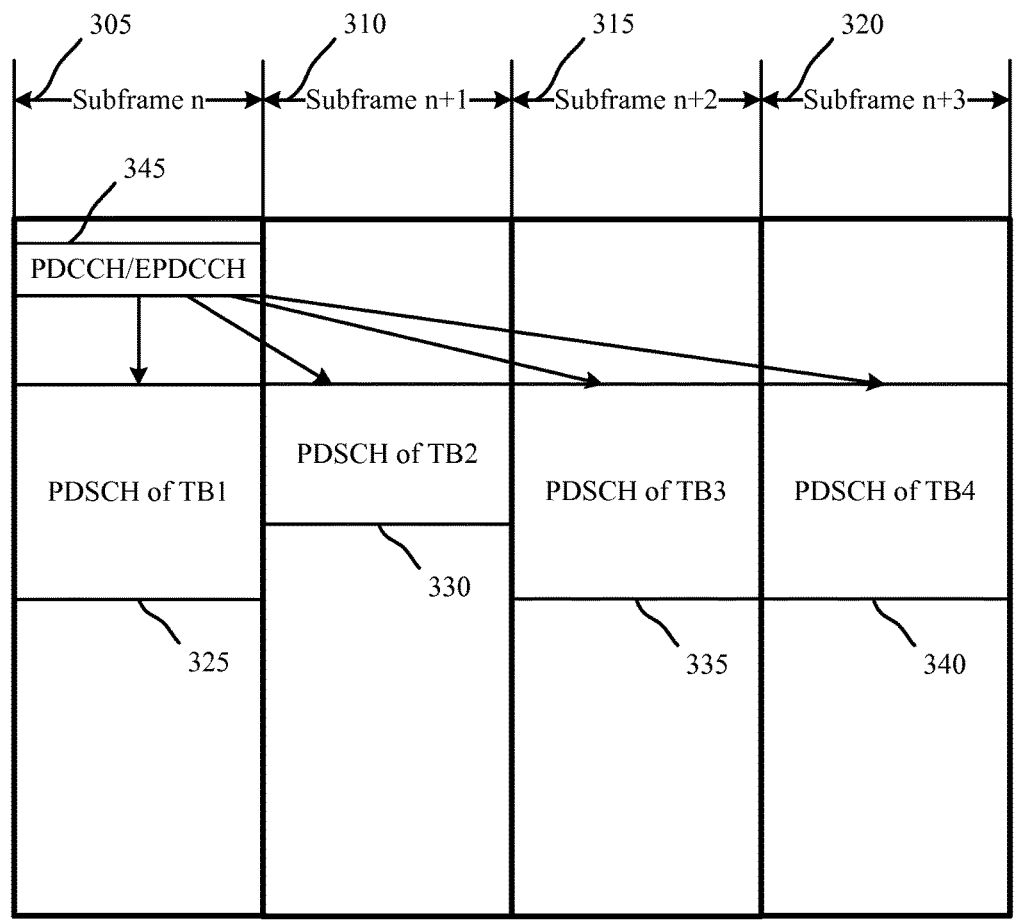
FIG. 3 shows another diagram of exemplary scheduling of multiple subframes in accordance with various examples.

According to some examples, a transport block size may be adjusted based on differences between one or more subframes in a multi-subframe assignment. For example, with reference to FIG. 3, a diagram 300 illustrates multi-subframe scheduling according to various examples in which a transport block size of one or more subframes may be adjusted. In this diagram, four subframes 305-320 are illustrated, namely subframe n 305, subframe n+1 310, subframe n+2 315, and subframe n+3 320. Each subframe 305-320 includes corresponding PDSCH resources 325-340 that are allocated to the UE (e.g., UE 115 of FIG. 1). The scheduling for PDSCH resources 325-340, in some examples, is transmitted to the UE from an eNB (e.g., eNB 105 of FIG. 1) on control channel transmission 345. In this example, subframe n+1 310 may have a PDSCH resource 330 having an adjusted transport block size, which is adjusted based on PDSCH resource availability during subframe n+1 310. For example, the TBS for subframe n 305 may be determined according to known techniques as a function of the number of RBs ($N_{RBs}$) and a MCS index ($I_{MCS}$) for subframe n 305. That is, $TBS_n$ may be determined as $f(N_{RBs}, I_{MCS})$. In some examples, $TBS_n$ may be determined according to a lookup table based on $N_{RB}$ and $I_{MCS}$. In one example, subframe n+1 310 has a reduced number of RBs available, which may result from a situation such as described above, for example.

The TBS for subframe n+1 310 may be determined by scaling the TBS for subframe n 305, according to some examples. For example, for subframe n+1 ($TBS_{n+1}$) may be determined as $$f\left(\text{ceiling}\left(\frac{N_{REs,n+1}}{N_{REs,n}} * N_{RBs}\right), I_{MCS}\right).$$

Thus, the TBS for subframe n+1 310 may be determined by scaling the number of available RBs ($N_{RBs}$) for subframe n+1 by ratio of the number of Resource Elements (REs) of subframe n+1 ($N_{REs}$, n+1) and the number of REs of subframe n ($N_{REs}$, n), and using a similar function or lookup table to determine TBS as described above. Alternatively, in some examples, the TBS for subframe n+1 310 may be determined by scaling the TBS for subframe n 305 directly based on the number of REs for subframe n 305 and subframe n+1 310, namely, $$TBS_{n+1} = \left(\frac{N_{REs,n+1}}{N_{REs,n}} * TBS_n\right).$$

Both the UE and the eNB are aligned regarding such an adjustment, and in some examples the eNB may provide instructions for scaling to the UE in order to ensure alignment of the adjustment. Such instructions may be provided, for example, in RRC signaling to enable or disable TBS adjustment in multi-subframe assignments and specific rules on how to make the adjustment, such as rules for scaling the number of RBs used in TBS determination functions or scaling TBS directly based on REs of different subframes, for example. In other examples, the MCS for one or more of the subframes may be adjusted to a different MCS index value, which may also define a different transport block size. MCS index adjustment may be provided, similarly as described above, in RRC signaling to enable or disable MCS index adjustment in multi-subframe assignments and specific rules on how to make the adjustment based on the differences in the different subframe characteristics.

Figure 4:
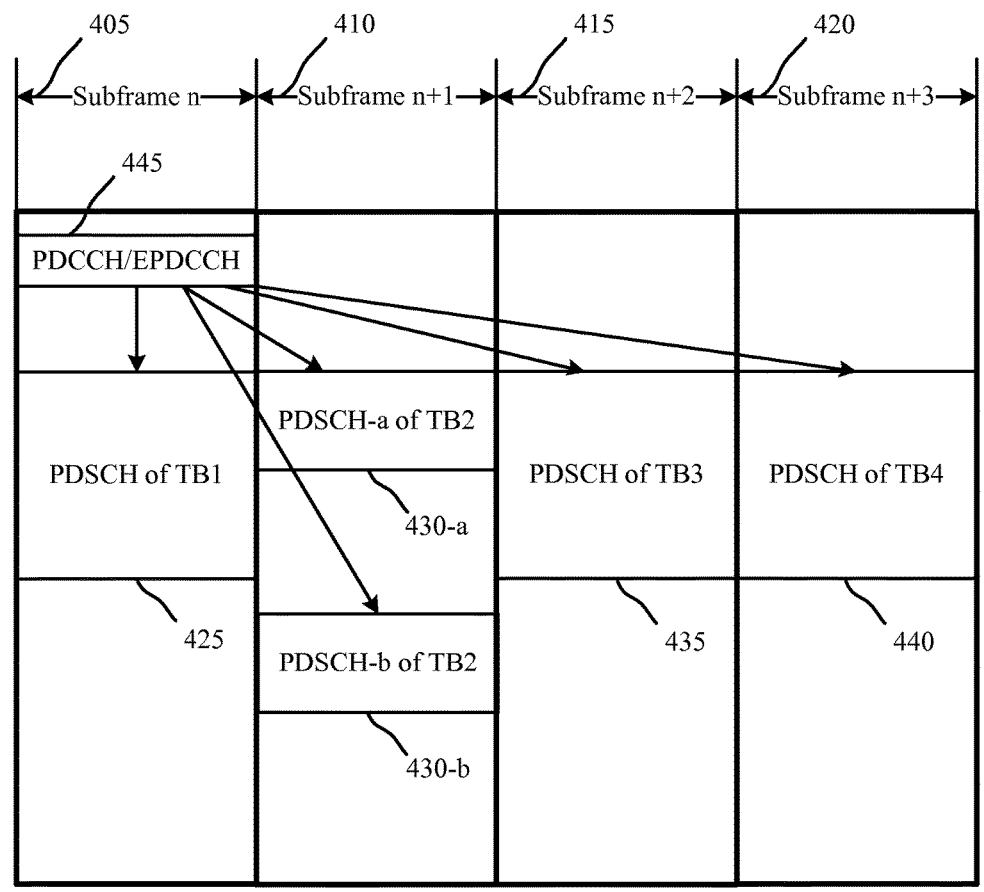
FIG. 4 shows another diagram of exemplary scheduling of multiple subframes in accordance with various examples.

According to some examples, resource allocations may be adjusted based on differences between one or more subframes in a multi-subframe assignment. For example, with reference to FIG. 4, a diagram 400 illustrates multi-subframe scheduling according to various examples in which resource allocations of one or more subframes may be adjusted. In this diagram, four subframes 405-420 are illustrated, namely subframe n 405, subframe n+1 410, subframe n+2 415, and subframe n+3 420. Each subframe 405-420 includes corresponding PDSCH resources 425-440 that are allocated to the UE (e.g., UE 115 of FIG. 1). The scheduling for PDSCH resources 425-440, in some examples, is transmitted to the UE from an eNB (e.g., eNB 105 of FIG. 1) on control channel transmission 445. In this example, subframe n+1 410 may have PDSCH resource 430-a and PDSCH resource 430-b, which may occupy different RBs from the RBs of subframe n 405. Resource allocations may be accomplished according to a downlink control index (DCI) that may be used to provide resource locations and the number of RBs.

In some examples, DCI information may be used to provide resource allocation for PDSCH of TB1 425 in subframe n, and it may be determined that subframe n+1 410 has different characteristics from subframe n 405, and that one or more of the RBs in PDSCH resource 425 may not be available in subframe n+1 410. For example, PDSCH resource 425 may include RBs 21-30 in subframe n 405. It may be determined that in subframe n+1, due to PSS, SSS, and/or PBCH transmission, for example, the center six RBs (i.e., RBs 22-27) may not be available for PDSCH. In one example, the PDSCH resources 430 of subframe n+1 410 are divided into non-contiguous RBs of PDSCH-a 430-a and PDSCH-b 430-b resources, such as RBs 21 and 28-30, for example. In other examples, the PDSCH resources 430 of subframe n+1 410 may be re-mapped to contiguous RBs at a different available location of subframe n+1 410. In still further examples, a rank of the one or more subframes relative to a rank of subframe n 405 may be adjusted. Both the UE and the eNB are aligned regarding such an adjustment, and in some examples the eNB may provide instructions for resource allocation adjustment to the UE in order to ensure alignment of the adjustment. Such instructions may be provided, for example, in RRC signaling to enable or disable resource allocation adjustment in multi-subframe assignments and specific rules on how to make the adjustment, such as rules for simply removing any unavailable RBs from an allocation or re-mapping resources to other available RBs in the affected subframe.

Figure 5:
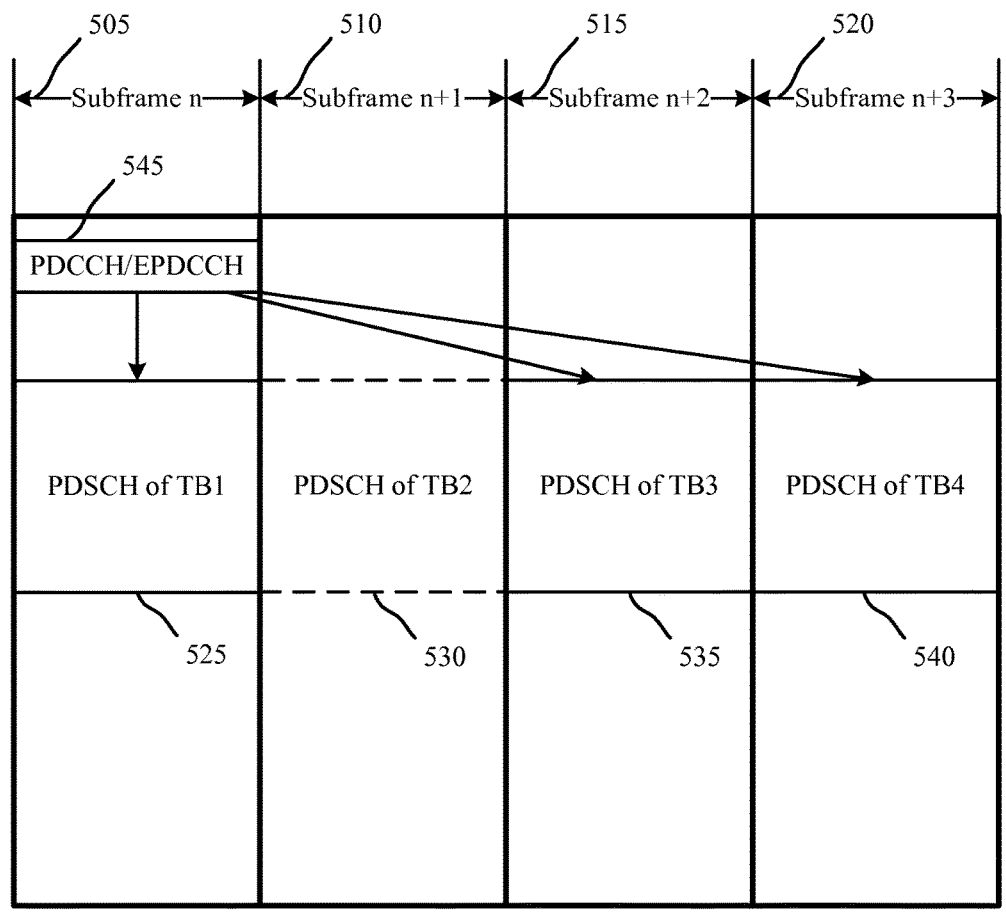
FIG. 5 shows another diagram of exemplary scheduling of multiple subframes in accordance with various examples.

According to some examples, resource allocations for one or more subframes may be skipped based on differences between one or more subframes in a multi-subframe assignment. For example, with reference to FIG. 5, a diagram 500 illustrates multi-subframe scheduling according to various examples in which resource allocations of one or more subframes may be skipped. In this diagram, four subframes 505-520 are illustrated, namely subframe n 505, subframe n+1 510, subframe n+2 515, and subframe n+3 520. Each subframe 505-520 includes corresponding PDSCH resources 525-540 that are allocated to the UE (e.g., UE 115 of FIG. 1). The scheduling for PDSCH resources 525-540, in some examples, is transmitted to the UE from an eNB (e.g., eNB 105 of FIG. 1) on control channel transmission 545. In this example, subframe n+1 510 may have certain characteristics that result in the PDSCH resource 530 of the subframe being skipped. In some examples, a set of rules may be used to determine that subframes have characteristics that result in a resource allocation for the subframe being skipped. For example, subframe n+1 510 may be may be a special TDD subframe with a certain configuration, such as a special subframe having 3 downlink control symbols or less. In such a case, the PDSCH resource allocation for subframe n+1 510 may be skipped. In other examples, subframe n+1 510 may have PDSCH resources 530 that overlap with one or more of PSS, SSS, and/or PBCH, resulting in the PDSCH resource allocation for subframe n+1 510 being skipped. Thus, rather than trying to schedule resources around control information in such a subframe, the resource allocation for the subframe is simply skipped.

In other examples, subframe n+1 510 may be an ABS subframe, which is skipped for monitoring (for PDSCH) or transmission (for PUSCH). In still other examples, subframe n+1 510 may be skipped when the subframe falls into a measurement gap. In still further examples, a UE may be configured by RRC to operate according to rules that define that if the PDSCH assignment starts in an even-numbered subframe (i.e., subframe 0, 2, 4, 6, or 8) that the scheduling assignment is valid for four consecutive subframes, namely subframes n, n+1, n+2, and n+3. The rules may further define that if the PDSCH assignment starts in an odd-numbered subframe (i.e., subframe 1, 3, 5, 7, or 9) that the scheduling assignment is valid for three subframes, namely subframes n, n+1, and n+3, thus avoiding many special subframes that may be present. Both the UE and the eNB are aligned regarding such skipping of subframe resource scheduling, and in some examples the eNB may provide instructions for resource allocation adjustment and skipping of resource allocations to the UE in order to ensure alignment of skipped subframes. Such instructions may be provided, for example, in RRC signaling to enable or disable skipping of certain subframes in multi-subframe assignments and specific rules on how to make the determination to skip a subframe.

Figure 6:
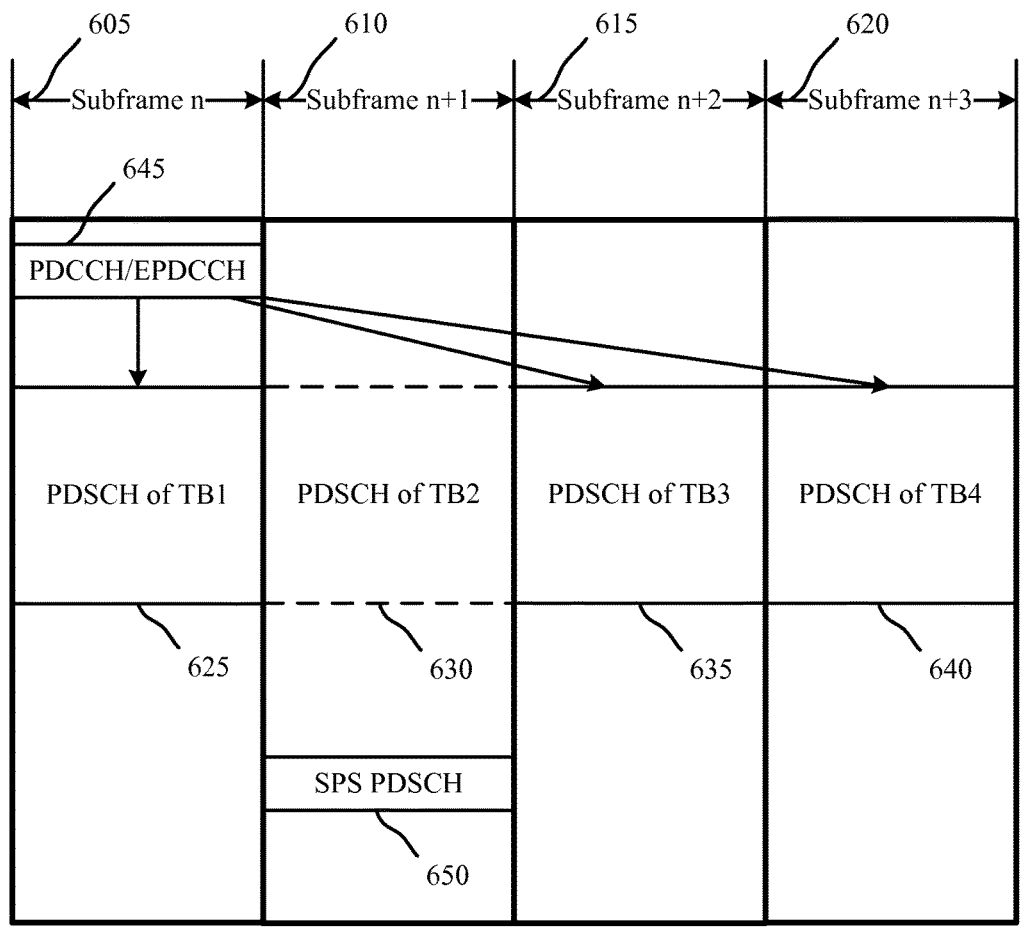
FIG. 6 shows another diagram of exemplary scheduling of multiple subframes in accordance with various examples.

Additionally, according to some examples, scheduling for a subframe may be skipped in the event that the subframe has a semi-persistent scheduling (SPS) assignment. For example, with reference to FIG. 6, a diagram 600 illustrates multi-subframe scheduling according to various examples in which resource allocations of one or more subframes having an SPS assignment may be skipped. In this diagram, four subframes 605-620 are illustrated, namely subframe n 605, subframe n+1 610, subframe n+2 615, and subframe n+3 620. Each subframe 605-620 includes corresponding PDSCH resources 625-640 that are allocated to the UE (e.g., UE 115 of FIG. 1). The scheduling for PDSCH resources 625-640, in some examples, is transmitted to the UE from an eNB (e.g., eNB 105 of FIG. 1) on control channel transmission 645. In this example, subframe n+1 610 may have an SPS allocation 650. In such a case, the PDSCH resource 630 of the subframe may be skipped. In some other examples, the PDSCH resource 630 may continue to be scheduled, and the SPS assignment skipped. In still further examples, the resource allocation of PDSCH resources 630 may be adjusted to schedule around the SPS PDSCH resources. Similarly as discussed above, both the UE and the eNB are aligned regarding such skipping of subframe resource scheduling, and in some examples the eNB may provide instructions for skipping of resource allocations to the UE in order to ensure alignment of skipped subframes. Such instructions may be provided, for example, in RRC signaling to enable or disable skipping of certain subframes in multi-subframe assignments and specific rules on how to make the determination to skip a subframe.

Figure 7:
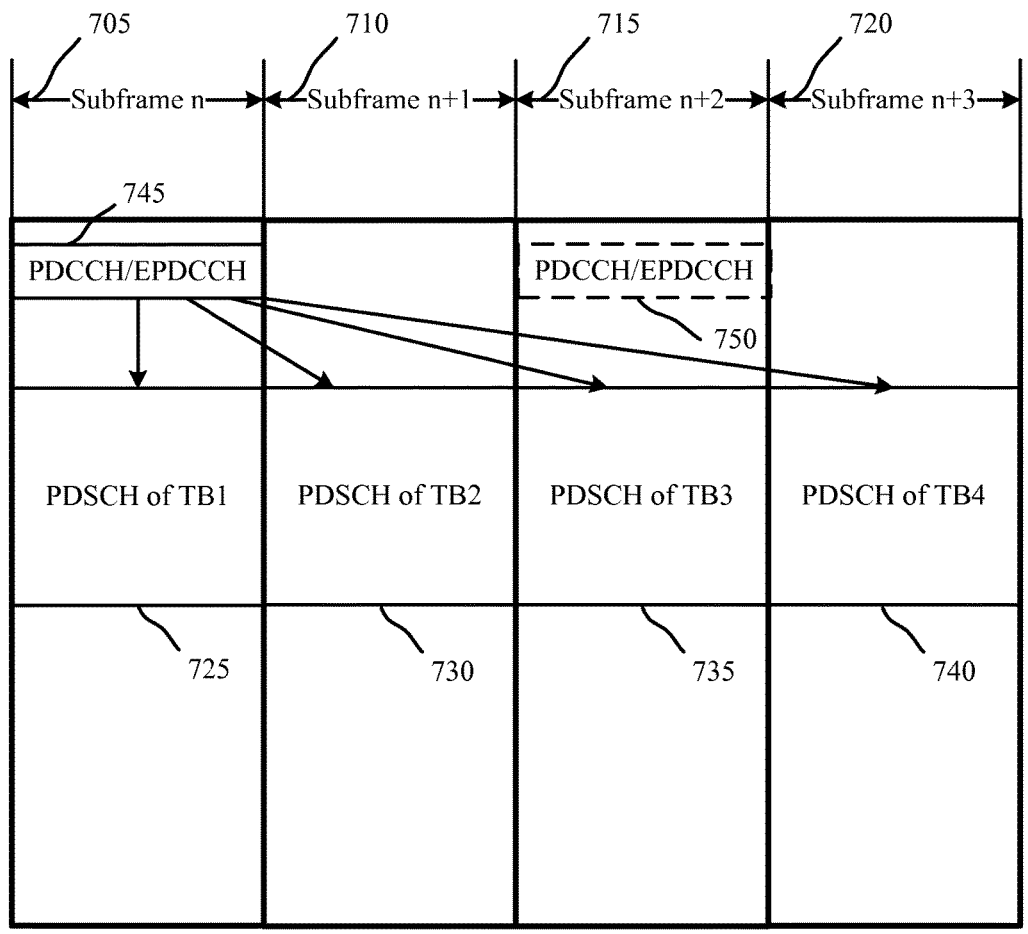
FIG. 7 shows another diagram of exemplary scheduling of multiple subframes in accordance with various examples.

With reference now to FIG. 7, a diagram 700 illustrates multi-subframe scheduling according to various examples in which a control channel transmission may indicate a second scheduling assignment. In this diagram, four subframes 705-720 are illustrated, namely subframe n 705, subframe n+1 710, subframe n+2 715, and subframe n+3 720. Each subframe 705-720 includes corresponding PDSCH resources 725-740 that are allocated to the UE (e.g., UE 115 of FIG. 1). The scheduling for PDSCH resources 725-740, in some examples, is transmitted to the UE from an eNB (e.g., eNB 105 of FIG. 1) on control channel transmission

745. In this example, a second scheduling for PDSCH resources is transmitted to the UE from the eNB on control channel transmission 750. In the example, of FIG. 7, the second scheduling for PDSCH resources may be ignored, and resource scheduling for subframes 705-720 may continue according to resource allocations provided in control channel transmission 745. In other examples, the new control channel transmission 750 may replace existing scheduling information provided by the first control channel transmission 745. Similarly as discussed above, both the UE and the eNB are aligned regarding such treatment of a second control channel transmission 750, and in some examples the eNB may provide instructions for such treatment to the UE in order to ensure alignment of scheduled resources. Such instructions may be provided, for example, in RRC signaling regarding the treatment of such a second control channel transmission during a multi-subframe assignment.

In further examples, whether and how to perform multi-subframe scheduling may also depend on other factors. For example, certain types of PDSCH may not be compatible with multi-subframe scheduling. For example, broadcast or multicast PDSCH transmissions may not be compatible with multi-subframe scheduling. Furthermore, certain DCI formats may, according to some examples, indicate whether and how multi-subframe scheduling may be conducted. For example, DCI formats 0 and 1A may indicate that no multi-subframe scheduling is permitted, and that multi-subframe scheduling may be permitted for DCI format 2D. Alternatively, in some examples, multi-subframe scheduling for two subframes may be permitted for DCI formats 0 and 1A, and four subframe scheduling may be allowed for DCI format 2D. Of course, numerous other examples will be readily apparent to one of skill in the art, and the above examples are not intended to provide an exhaustive list. Furthermore, multi-subframe scheduling may be performed based on decoding source or decoding candidate, with, for example, subframes from a common search space implemented without multi-subframe scheduling and subframes from a UE-specific search space scheduled for multi-subframe transmissions. In further examples, the control channel type may be used to determine the availability of multi-subframe scheduling. For example, PDCCH transmissions may not utilize multi-subframe scheduling, while EPDCCH transmissions may utilize multi-subframe scheduling. Additionally, in some aspects multi-subframe scheduling may be implemented in conjunction with small cells in an LTE system, in which channel condition may be managed relatively closely. Such channel conditions that may be present in such small cells may provide enhanced opportunities for overhead reduction associated with multi-subframe scheduling.

Figure 8:
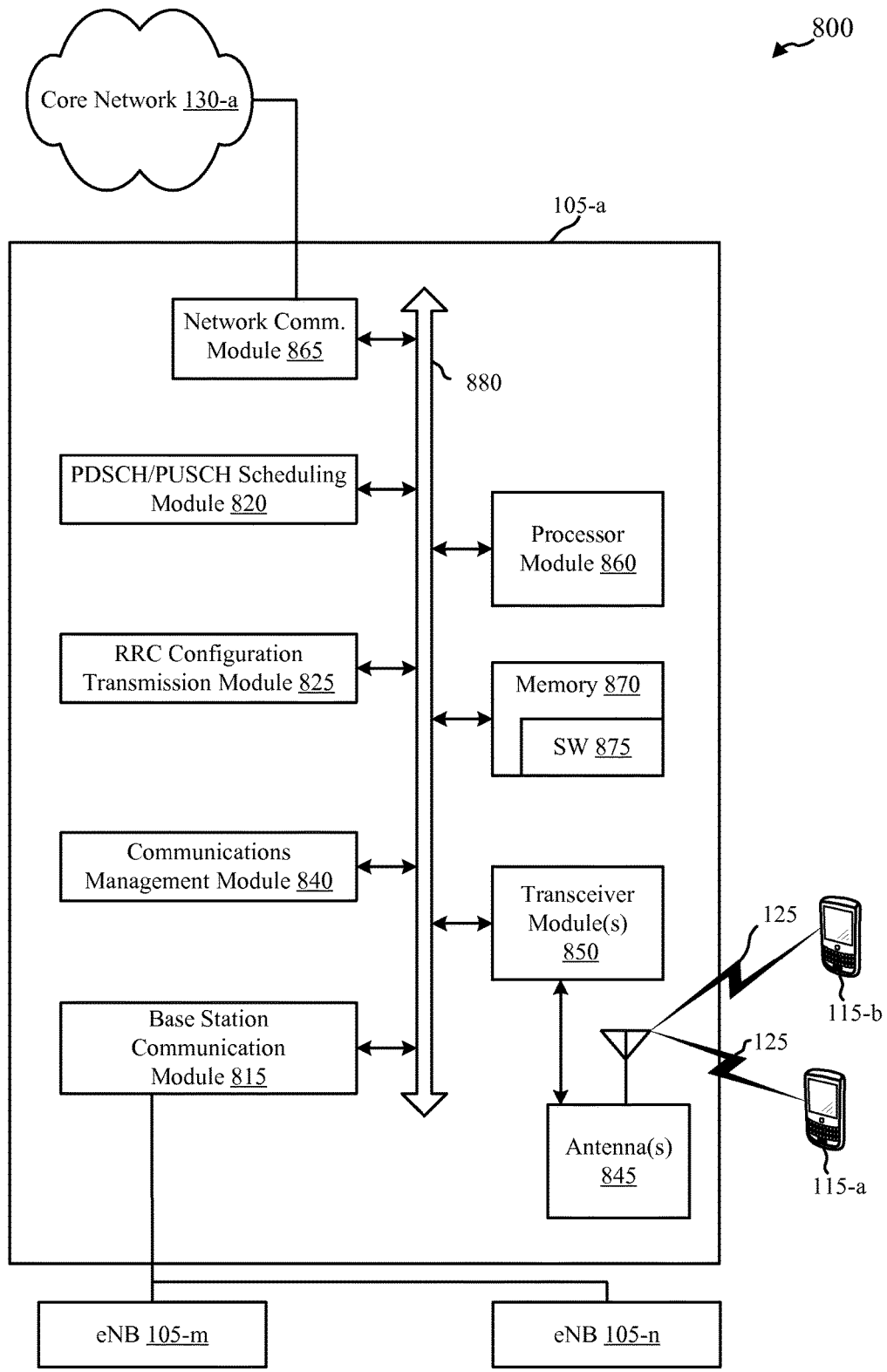
FIG. 8 shows an example of a wireless communications system and block diagram of an example of an eNB in accordance with various examples.

FIG. 8 shows a block diagram of a wireless communications system 800 that may be configured for multi-subframe scheduling according to various examples. This wireless communications system 800 may be an example of aspects of the wireless communications system 100 depicted in FIG. 1. The wireless communications system 800 may include an eNB 105-*a*. The eNB 105-*a* may include antenna(s) 845, a transceiver module 850, memory 870, and a processor module 860, which each may be in communication, directly or indirectly, with each other (e.g., over one or more buses 880). The transceiver module 850 may be configured to communicate bi-directionally, via the antenna(s) 845, with UEs 115-*a*, 115-*b*. The transceiver module 850 (and/or other components of the eNB 105-*f*) may also be configured to communicate bi-directionally with one or more networks. In some cases, the eNB 105-*a* may communicate with the core network 130-*a* through network communications module 865. The eNB 105-*f* may be an example of a base station, a Home eNodeB base station, a NodeB base station, and/or a Home NodeB base station.

The eNB 105-*a* may also communicate with other eNBs 105, such as eNB 105-*m* and eNB 105-*n*. In some cases, eNB 105-*a* may communicate with other eNBs such as 105-*m* and/or 105-*n* utilizing base station communication module 815. In some examples, base station communication module 815 may provide an X2 interface within an LTE wireless communication technology to provide communication between some of the eNBs 105. In some examples, the eNB 105-*a* may communicate with other eNBs through core network 130-*a*.

The memory 870 may include random access memory (RAM) and read-only memory (ROM). The memory 870 may also store computer-readable, computer-executable software code 875 containing instructions that are configured to, when executed, cause the processor module 860 to perform various functions described herein (e.g., call processing, database management, message routing, etc.). Alternatively, the computer-executable software code 875 may not be directly executable by the processor module 860 but be configured to cause the processor, e.g., when compiled and executed, to perform functions described herein.

The processor module 860 may include an intelligent hardware device, e.g., a central processing unit (CPU), a microcontroller, an application-specific integrated circuit (ASIC), etc. The transceiver module(s) 850 may include a modem configured to modulate the packets and provide the modulated packets to the antenna(s) 845 for transmission, and to demodulate packets received from the antenna(s) 845. While some examples of the eNB 105-*a* may include a single antenna 845, the eNB 105-*a* may include multiple antennas 845 for multiple links which may support carrier aggregation. For example, one or more links may be used to support macro communications with UEs 115-*a*, 115-*b*.

According to the architecture of FIG. 8, the eNB 105-*a* may further include a communications management module 840. The communications management module 840 may manage communications with other eNBs 105. By way of example, the communications management module 840 may be a component of the eNB 105-*a* in communication with some or all of the other components of the eNB 105-*a* via a bus 880. Alternatively, functionality of the communications management module 840 may be implemented as a component of the transceiver module 850, as a computer program product, and/or as one or more controller elements of the processor module 860.

In some examples, the transceiver module 850 in conjunction with antenna(s) 845, along with other possible components of eNB 105-*a*, may provide multi-subframe scheduling for communications with various UEs communicating with the eNB 105-*a*. In some examples, eNB 105-*a* includes a PDSCH/PUSCH scheduling module 820 that determines multi-subframe scheduling information for UEs 115-*a*, 115-*b*. In the example of FIG. 8, a multi-subframe scheduling communication may be transmitted to UE 115-*a* and/or UE 115-*b*, which may then operate according to multi-subframe scheduling similarly as discussed above with respect to FIGS. 2-7. A set of rules may be provided to UE 115-*a* and/or UE 115-*b* for operation according to multi-subframe scheduling, with such rules being provided through RRC configuration transmission module 825.

Figure 9:
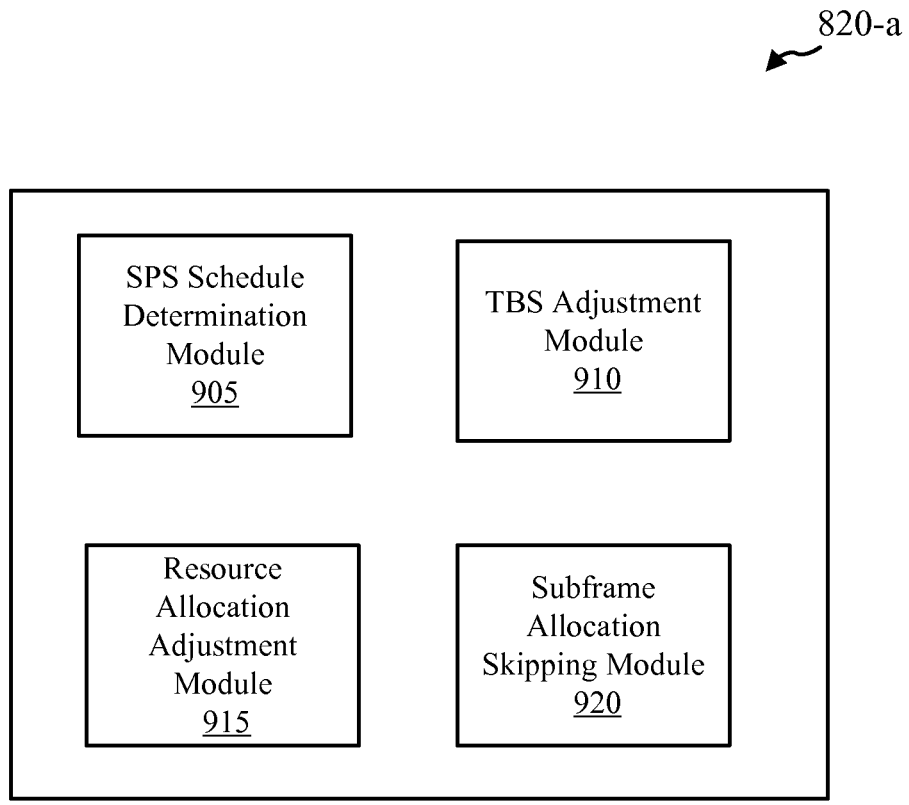
FIG. 9 shows a block diagram of an example of a scheduling module in accordance with various examples.

FIG. 9 illustrates an example of a PDSCH/PUSCH scheduling module 820-*a*, which includes an SPS schedule determination module 905, a TBS adjustment module 910, a resource allocation adjustment module, and a subframe allocation skipping module 920. The SPS schedule determination module 905 may determine if any subframes in a multi-subframe scheduling assignment are subject to an SPS resource allocation. In the event that one or more subframes in a multi-subframe assignment have an SPS assignment, the SPS schedule determination module 905 may determine that a resource allocation in the multi-subframe assignment should be skipped for the subframe, or may, in some examples, determine that the SPS allocation for the subframe is to be skipped, such as described above with respect to FIG. 6, for example. TBS adjustment module 910 may adjust a TBS for one or more subframes of a multi-subframe scheduling assignment. Such a TBS adjustment may be performed as discussed with respect to FIG. 3, for example. Resource allocation adjustment module 915 may adjust a resource allocation for one or more subframes of a multi-subframe scheduling assignment. Such a resource allocation adjustment may be performed as discussed with respect to FIG. 4, for example. Subframe allocation skipping module 920 may determine that scheduling of resources according to a multi-subframe assignment should be skipped for one or more subframes of a multi-subframe scheduling assignment. Such a determination may be performed as discussed with respect to FIG. 5, for example. The components of PDSCH/PUSCH scheduling module 820-a may, individually or collectively, be implemented with one or more ASICs adapted to perform some or all of the applicable functions in hardware. Each of the noted modules may be a means for performing one or more functions related to operation of the PDSCH/PUSCH scheduling module 820-a.

Figure 10:
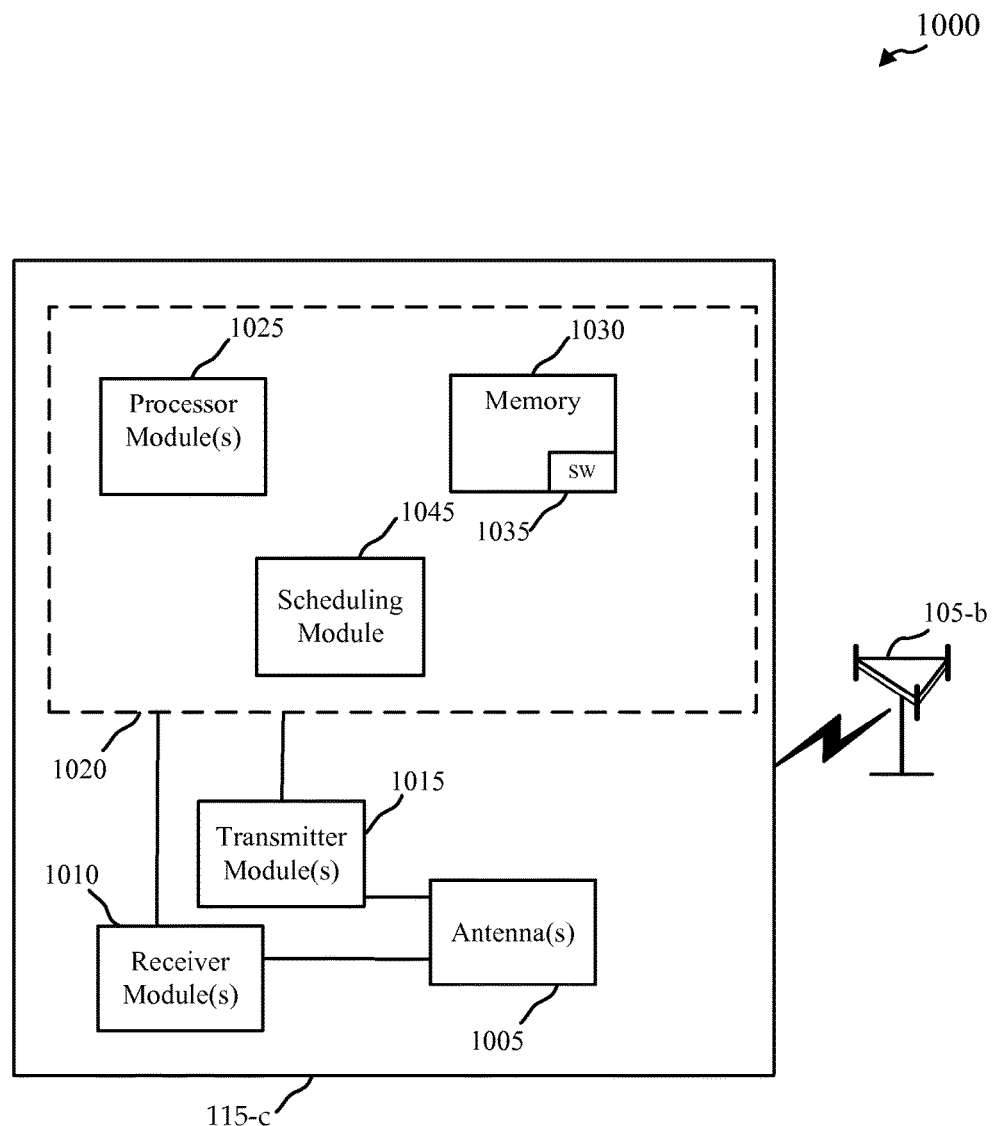
FIG. 10 shows an example of a wireless communications system and a block diagram of an example of a user equipment in accordance with various examples.

With reference now to FIG. 10, an example wireless communications system 1000 that performs multi-subframe scheduling is depicted. The wireless communications system 1000 includes a UE 115-c that may communicate with eNB 105-b to receive access to one or more wireless networks, and may be an example of aspects of the wireless communications system 100 of FIG. 1 or the wireless communications system 800 of FIG. 8. UE 115-c may be an example of one or more of the UEs 115 of FIG. 1 or 8. UE 115-c, includes one or more antenna(s) 1005 communicatively coupled to receiver module(s) 1010 and transmitter module(s) 1015, which are in turn communicatively coupled to a control module 1020. Control module 1020 includes one or more processor module(s) 1025, a memory 1030 that may include computer-executable software code 1035, and a scheduling module 1045. The computer-executable software code 1035 may be for execution by processor module 1025 and/or scheduling module 1045.

The processor module(s) 1025 may include an intelligent hardware device, e.g., a central processing unit (CPU), a microcontroller, an application specific integrated circuit (ASIC), etc. The memory 1030 may include random access memory (RAM) and read-only memory (ROM). The memory 1030 may store computer-readable, computer-executable software code 1035 containing instructions that are configured to, when executed (or when compiled and executed), cause the processor module 1025 and/or scheduling module 1045 to perform various functions described herein (e.g., multi-subframe scheduling, subframe characteristic determination, and adjustment of resources for subframes). The scheduling module 1045 may be implemented as a part of the processor module(s) 1025, or may be implemented using one or more separate CPUs or ASICs, for example. The transmitter module(s) 1015 may transmit to eNB 105-b (and/or other base stations) to establish communications with one or more wireless communications networks (e.g., E-UTRAN, UTRAN, etc.), as described above. The scheduling module 1045 may be configured to receive multi-subframe scheduling information from the eNB 105-b or another type of node and transmit/receive communications to/from the eNB 105-b according to the multi-subframe scheduling information, including determination of subframe characteristics and adjustment of resource allocations such as described above. The receiver module(s) 1010 may receive downlink transmissions from eNB 105-b (and/or other base stations), as described above. Downlink transmissions are received and processed at the UE 115-c. The components of UE 115-c may, individually or collectively, be implemented with one or more Application Specific Integrated Circuits (ASICs) adapted to perform some or all of the applicable functions in hardware. Each of the noted modules may be a means for performing one or more functions related to operation of the UE 115-c.

Figure 11:
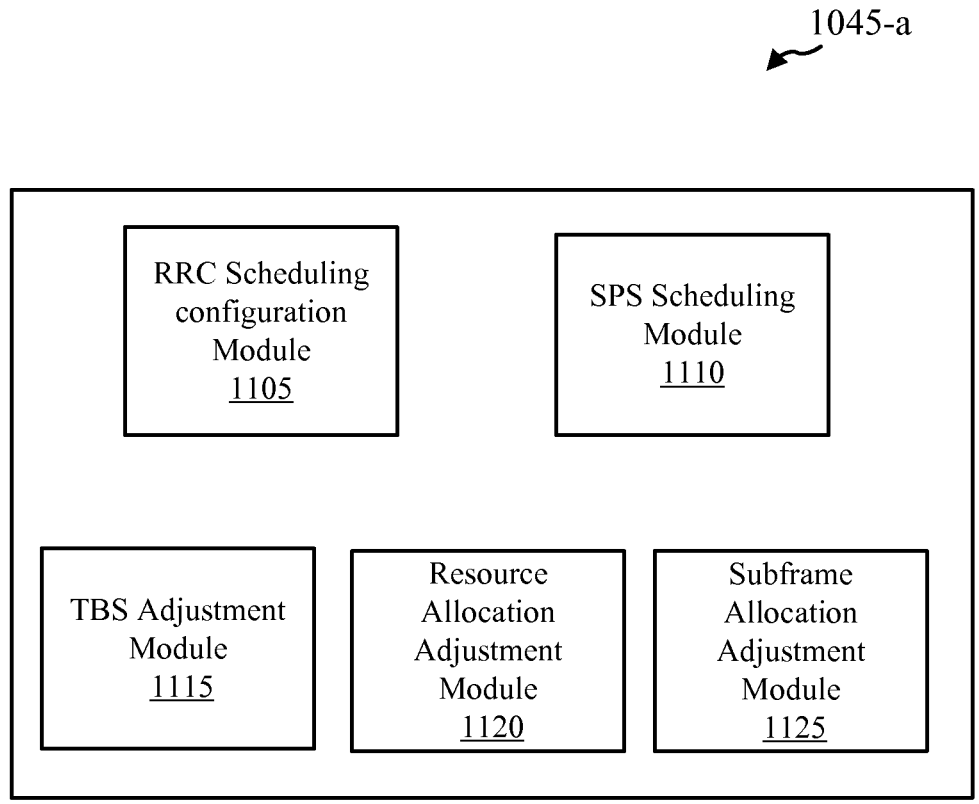
FIG. 11 shows a block diagram of an example of a scheduling module in accordance with various examples.

FIG. 11 illustrates an example of a scheduling module 1045-a, which includes an RRC scheduling configuration module 1105, an SPS scheduling module 1110, a TBS adjustment module 1115, and a resource allocation adjustment module 1120. The RRC scheduling configuration module 1105 may, according to various examples, receive RRC information that defines a set of rules for multi-subframe scheduling such as described above. For example, the RRC scheduling configuration module 1105 may receive information related to determinations to be made related to subframe characteristics, and adjustments to be made to scheduled resources for particular subframes based on the determination. SPS scheduling module 1110 may determine the presence of SPS scheduled resources and may make adjustments to either multi-subframe resource assignments or to SPS assignments based on the determination, such as described above with respect to FIG. 6. The TBS adjustment module 1115 may adjust a TBS for one or more subframes of a multi-subframe scheduling assignment. Such a TBS adjustment may be performed as discussed with respect to FIG. 3, for example. Resource allocation adjustment module 1120 may adjust a resource allocation for one or more subframes of a multi-subframe scheduling assignment. Such a resource allocation adjustment may be performed as discussed with respect to FIG. 4, for example. Subframe allocation skipping module 1125 may determine that scheduling of resources according to a multi-subframe assignment should be skipped for one or more subframes of a multi-subframe scheduling assignment. Such a determination may be performed as discussed with respect to FIG. 5, for example. The components of scheduling module 1045-a may, individually or collectively, be implemented with one or more ASICs adapted to perform some or all of the applicable functions in hardware. Each of the noted modules may be a means for performing one or more functions related to operation of the scheduling module 1045-a.

Figure 12:
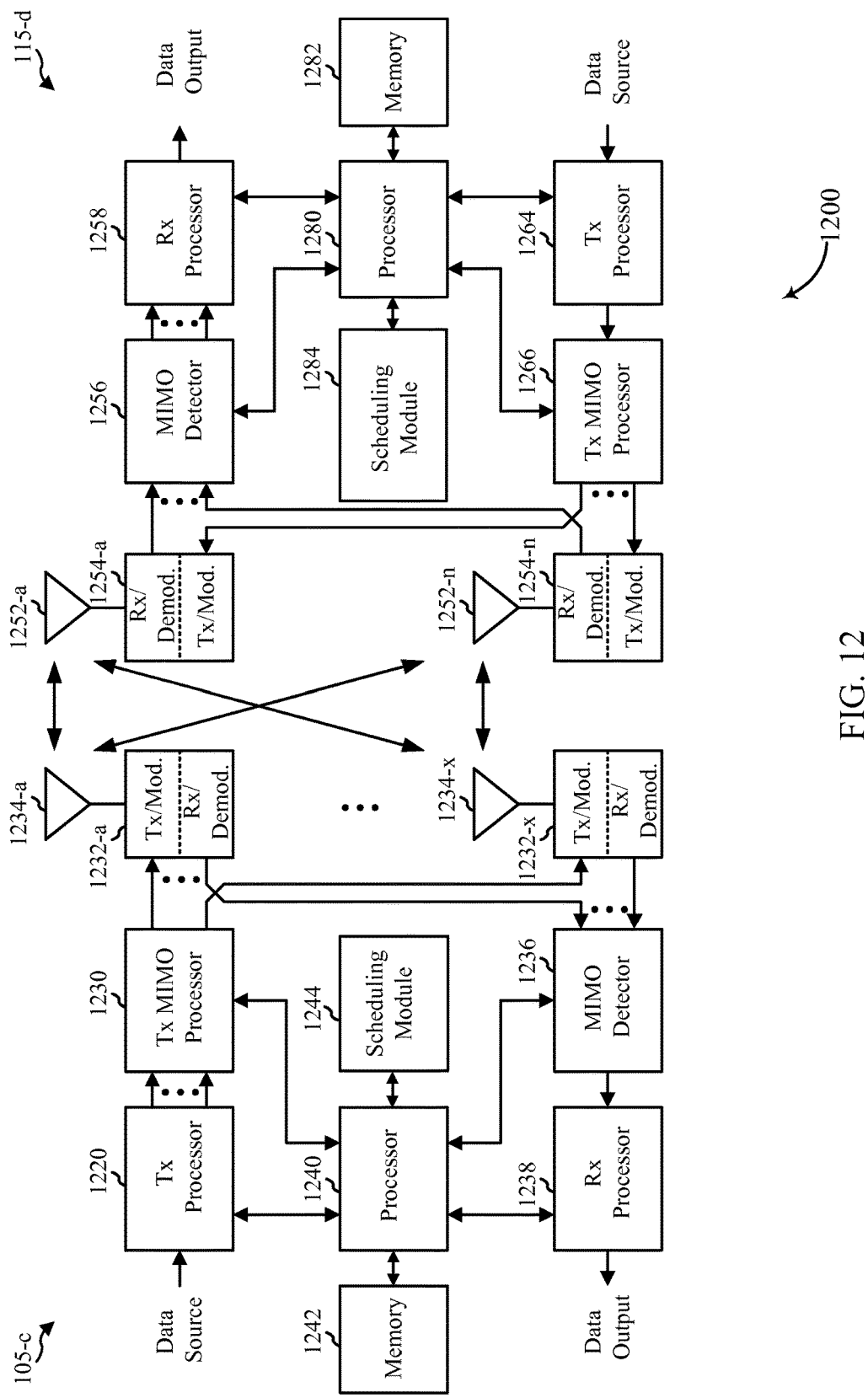
FIG. 12 is a block diagram of an example of a wireless communications system including an eNB and a UE in accordance with various examples.

FIG. 12 is a block diagram of a system 1200 including an eNB 105-c and a UE 115-d. This system 1200 may be an example of the wireless communications system 100 of FIG. 1, the wireless communications system 800 of FIG. 8, or the wireless communications system 1000 of FIG. 10. The eNB 105-c may be equipped with antennas 1234-a through 1234-x, and the UE 115-d may be equipped with UE antennas 1252-a through 1252-n. At the eNB 105-c, a transmit processor 1220 may receive data from a data source.

The transmit processor 1220 may process the data. The transmit processor 1220 may also generate reference symbols, and a cell-specific reference signal. A transmit (TX)

MIMO processor 1230 may perform spatial processing (e.g., precoding) on data symbols, control symbols, and/or reference symbols, if applicable, and may provide output symbol streams to the transmit modulator/demodulators 1232-a through 1232-x. Each modulator/demodulator 1232 may process a respective output symbol stream (e.g., for OFDM, etc.) to obtain an output sample stream. Each modulator/demodulator 1232 may further process (e.g., convert to analog, amplify, filter, and upconvert) the output sample stream to obtain a downlink (DL) signal. In one example, DL signals from modulator/demodulators 1232-a through 1232-x may be transmitted via the antennas 1234-a through 1234-x, respectively according to a particular FDD or TDD Uplink/Downlink configurations.

At the UE 115-d, the UE antennas 1252-a through 1252-n may receive the DL signals according to the particular TDD Uplink/Downlink configuration from the eNB 105-c and may provide the received signals to the modulator/demodulators 1254-a through 1254-n, respectively. Each modulator/demodulator 1254 may condition (e.g., filter, amplify, downconvert, and digitize) a respective received signal to obtain input samples. Each modulator/demodulator 1254 may further process the input samples (e.g., for OFDM, etc.) to obtain received symbols. A MIMO detector 1256 may obtain received symbols from all the modulator/demodulators 1254-a through 1254-n, perform MIMO detection on the received symbols if applicable, and provide detected symbols. A receive processor 1258 may process (e.g., demodulate, deinterleave, and decode) the detected symbols, providing decoded data for the UE 115-d to a data output, and provide decoded control information to a processor 1280, or memory 1282. The processor 1280 may be coupled with a scheduling module 1284 that may determine multi-subframe scheduling assignments, one or more characteristics of subframes subject to a multi-subframe scheduling assignment, and make adjustments to scheduling assignments based on the determined subframe characteristics, such as described above.

On the uplink (UL), at the UE 115-d, a transmit processor 1264 may receive and process data from a data source. The transmit processor 1264 may also generate reference symbols for a reference signal. The symbols from the transmit processor 1264 may be precoded by a transmit MIMO processor 1266 if applicable, further processed by the modulator/demodulators 1254-a through 1254-n (e.g., for SC-FDMA, etc.), and be transmitted to the eNB 105-c in accordance with the transmission parameters received from the eNB 105-c. At the eNB 105-c, the UL signals from the UE 115-d may be received by the antennas 1234, processed by the modulator/demodulators 1232, detected by a MIMO detector 1236 if applicable, and further processed by a receive processor 1238. The receive processor 1238 may provide decoded data to a data output and to the processor 1240. A memory 1242 may be coupled with the processor 1240. The processor 1240 may perform frame formatting according to a current TDD UL/DL configuration. A scheduling module 1244 may, in some examples, determine multi-subframe scheduling assignments, one or more characteristics of subframes subject to a multi-subframe scheduling assignment, and make adjustments to scheduling assignments based on the determined subframe characteristics, similarly as described above. System 1200 may support operation on multiple component carriers, each of which include waveform signals of different frequencies that are transmitted between eNB 105-c and UEs 115-d. Multiple component carriers may carry uplink and downlink transmissions between UE 115-d and eNB 105-c. The components of the UE 115-d may, individually or collectively, be implemented with one or more Application Specific Integrated Circuits (ASICs) adapted to perform some or all of the applicable functions in hardware. Each of the noted modules may be a means for performing one or more functions related to operation of the system 1200. Similarly, the components of the eNB 105-c may, individually or collectively, be implemented with one or more Application Specific Integrated Circuits (ASICs) adapted to perform some or all of the applicable functions in hardware. Each of the noted components may be a means for performing one or more functions related to operation of the system 1200.

Figure 13:
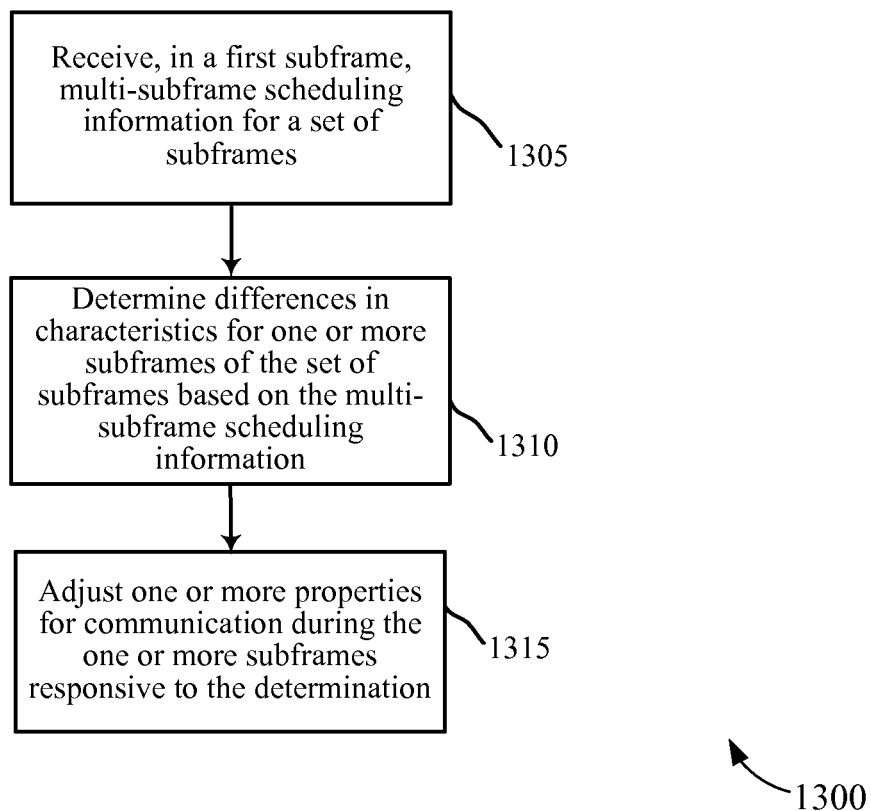
FIG. 13 is a flowchart of a method for multi-subframe scheduling in accordance with various examples.

FIG. 13 illustrates a method 1300 that may be carried out by a user equipment of a wireless communications system according to various examples. The method 1300 may, for example, be performed by a UE of FIG. 1, 8, 10, or 12, or using any combination of the devices described for these figures. Initially, at block 1305, the UE receives, in a first subframe, multi-subframe scheduling information for a set of subframes. The multi-subframe scheduling information may provide scheduling for the first subframe and, for example, two or more additional subframes. At block 1310, the UE determines differences in characteristics for one or more subframes of the set of subframes based on the multi-subframe scheduling information. The determining of differences in characteristics may include, for example, determining that at least one subframe of the set of subframes has different available resource blocks (RBs) from the first subframe. Such a determination may be made by determining available resource blocks and resource blocks that may be reserved for particular operations, such as synchronization operations, for example. The determining of differences in characteristics also may include, for example, determining the presence of a collision condition with at least one of a primary synchronization signal, a secondary synchronization signal, a primary broadcast channel, a common reference signal, a positioning reference signal, or a channel state information reference signal. The determining of differences in characteristics may further include, for example, determining that a type of subframe of the one or more subframes is different from the type of first subframe, the type of subframe comprising at least one of a multicast broadcast single frequency network (MBSFN) downlink subframe, a non-MBSFN subframe, a special subframe, or an almost blank subframe. Additionally or alternatively, the determining of differences in characteristics may include, for example; determining that the one or more subframes has a type indication that disallows physical downlink shared channel (PDSCH) or physical uplink shared channel (PUSCH) transmission. Additionally, in some cases, the determining of differences in characteristics may include, for example; determining that the one or more subframes has a semi-persistent scheduling (SPS) assignment.

At block 1315, the UE adjusts one or more properties for communication during the one or more subframes responsive to the determination. For example, the UE may adjust a transport block size (TBS) of the one or more subframes relative to a transport block size of the first subframe. Adjustment of transport block size may be based on the number of resource elements available in the one or more subframes relative to the first subframe, and may include scaling of TBS based on the resource elements, similarly as described above, for example. The UE also may adjust a modulation and coding scheme (MCS) of the one or more subframes relative to a MCS of the first subframe. The UE, in some examples, may adjust a rank of the one or more subframes relative to a rank of the first subframe. Additionally or alternatively, the UE may adjust transmission resources based on a punctured demodulation reference signal (DM-RS) pattern. Furthermore, the UE may adjust scheduling of resources so as to skip a resource allocation of the one or more subframes.

Figure 14:
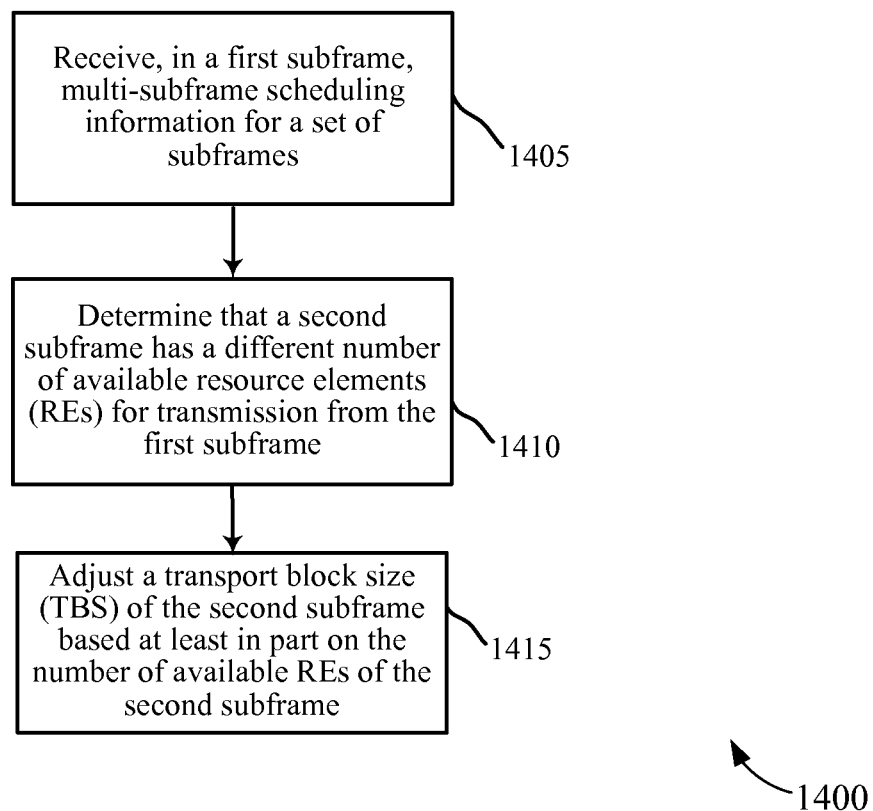
FIG. 14 is a flowchart of another method for multi-subframe scheduling in accordance with various examples.

FIG. 14 illustrates a method 1400 that may be carried out by a user equipment of a wireless communications system according to various examples. The method 1400 may, for example, be performed by a UE of FIG. 1, 8, 10, or 12, or using any combination of the devices described for these figures. Initially, at block 1405, the UE receives, in a first subframe, multi-subframe scheduling information for a set of subframes. The multi-subframe scheduling information may be received from an eNB or from a different wireless node (e.g., another UE). The multi-subframe scheduling information may provide scheduling for the first subframe and, for example, two or more additional subframes. At block 1410, the UE determines that a second subframe has a different number of available resource elements (REs) for transmission from the first subframe. The number of available REs may be different due to, for example, the presence of other information to be transmitted in the second subframe, such as PSS or SSS, for example. At block 1415, the UE adjusts a transport block size (TBS) of the second subframe based at least in part on the number of available REs of the second subframe. Adjusting the TBS may include, for example, scaling the TBS of the second subframe based at least in part on a modulation and coding scheme (MCS) and a ratio of the number of available REs of the second subframe and a number of available REs of the first subframe. In some examples, adjusting the TBS includes scaling the TBS of the second subframe based at least in part on the TBS of the first subframe and a ratio of the number of available REs of the second subframe and a number of available REs of the first subframe.

Figure 15:
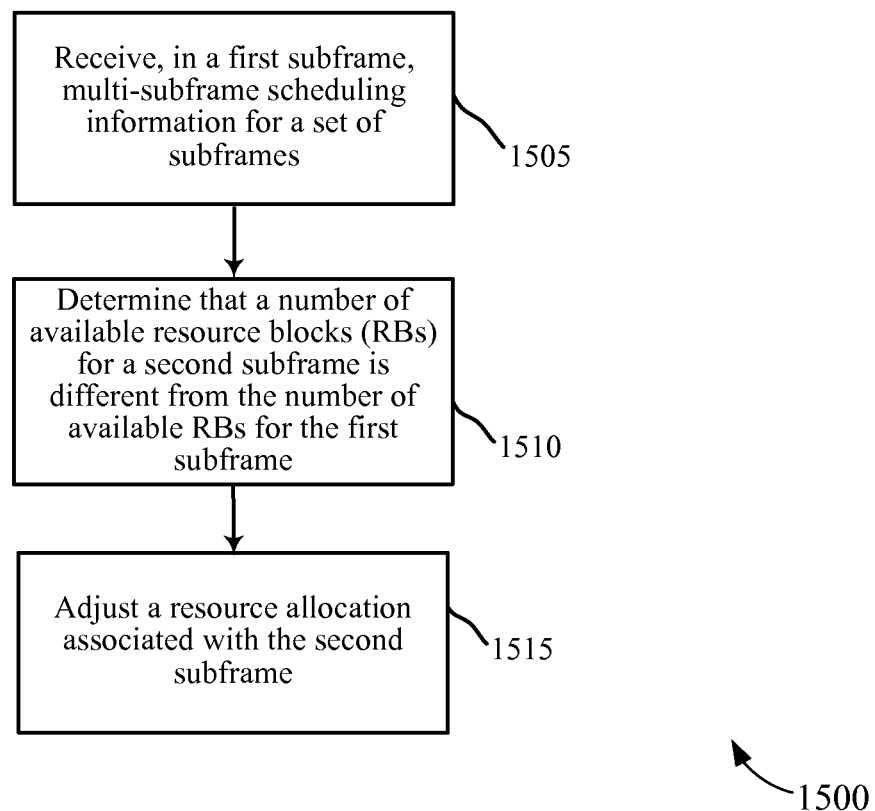
FIG. 15 is a flowchart of another method for multi-subframe scheduling in accordance with various examples.

FIG. 15 illustrates a method 1500 that may be carried out by a user equipment of a wireless communications system according to various examples. The method 1500 may, for example, be performed by a UE of FIG. 1, 8, 10, or 12, or using any combination of the devices described for these figures. Initially, at block 1505, the UE receives, in a first subframe, multi-subframe scheduling information for a set of subframes. The multi-subframe scheduling information may be received from an eNB or from a different wireless node (e.g., another UE). The multi-subframe scheduling information may provide scheduling for the first subframe and, for example, two or more additional subframes. At block 1510, the UE determines a number of available resource blocks (RBs) for a second subframe is different from the number of available RBs for the first subframe. The number of available RBs may be different due to, for example, the presence of other information to be transmitted in the second subframe, such as PSS or SSS, for example. In some examples, the UE may determine that a PSS or SSS is to be transmitted in the second subframe, and also determines a first set of RBs in the second subframe to be used for the PSS or SSS and a second set of RBs in the second subframe, the second set of RBs including RBs other than RBs included in the first set. At block 1515, the UE adjusts a resource allocation of the second subframe. Adjusting the resource allocation may include, continuing with the above example, scheduling the second set of RBs for transmission in the second subframe.

Figure 16:
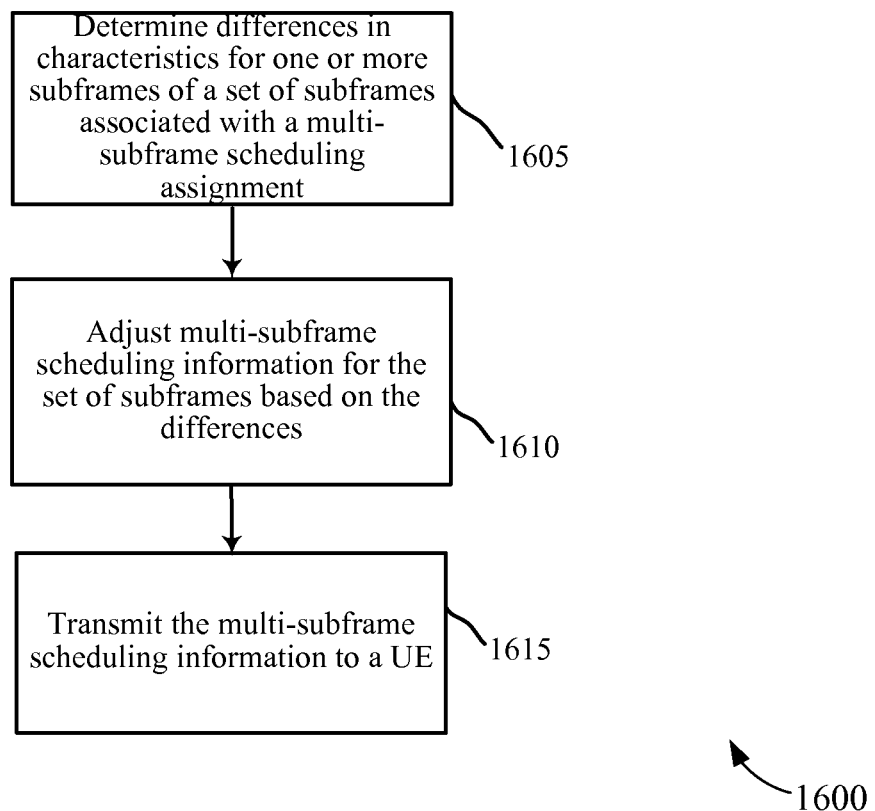
FIG. 16 is a flowchart of another method for multi-subframe scheduling in accordance with various examples.

FIG. 16 illustrates a method 1600 that may be carried out by an eNB of a wireless communications system according to various examples. Alternatively, the method 1600 may be performed by another type of base station or wireless node (e.g., a UE). The method 1600 may, for example, be performed by one or more of the eNBs of FIG. 1, 8, 10, or 12, or using any combination of the devices described for these figures. Initially, at block 1605, the eNB determines differences in characteristics for one or more subframes of a set of subframes associated with a multi-subframe scheduling assignment. Such a determination may include, for example, determining that at least one subframe of the set of subframes has different available resource blocks (RBs) from the first subframe. Such a determination may also include, for example, determining that at least one subframe of the set of subframes has a collision condition with at least one of a primary synchronization signal, a secondary synchronization signal, a primary broadcast channel, a common reference signal, a positioning reference signal, or a channel state information reference signal. In some examples, the determination may include determining that at least one subframe of the set of subframes has a subframe type that is different from a type of the first subframe, the type of subframe comprising at least one of a multicast broadcast single frequency network (MBSFN) downlink subframe, a non-MBSFN subframe, a special subframe, or an almost blank subframe. In further examples, such a determination may include determining that at least one subframe of the set of subframes has a type indication that disallows physical downlink shared channel (PDSCH) or physical uplink shared channel (PUSCH) transmission. In further examples, the determination may include determining that at least one subframe of the set of subframes has a semi-persistent scheduling (SPS) assignment.

Following the determination of differences in characteristics, at block 1610, the eNB adjusts multi-subframe scheduling information for the set of subframes based on the differences. Adjusting the multi-subframe scheduling information may include, for example, adjusting a transport block size (TBS) of the one or more subframes relative to a transport block size of the first subframe, similarly as discussed above. Adjusting may also include adjusting a modulation and coding scheme (MCS) of the one or more subframes relative to a MCS of the first subframe. In further examples, the adjusting may include adjusting a rank of the one or more subframes relative to a rank of the first subframe. Additionally or alternatively, the eNB may adjust transmission resources based on a punctured demodulation reference signal (DM-RS) pattern, and/or adjust scheduling of resources so as to skip scheduling of resources for the one or more subframes. Finally, at block 1615, the eNB transmits the multi-subframe scheduling information to a UE.

The detailed description set forth above in connection with the appended drawings describes exemplary examples and does not represent the only examples that may be implemented or that are within the scope of the claims. The term "exemplary" used throughout this description means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-Ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method of wireless communication performed by a user equipment (UE), comprising:
   receiving, in a first subframe, multi-subframe scheduling information for a set of subframes;
   determining differences in characteristics for one or more subframes of the set of subframes based on the multi-subframe scheduling information; and
   adjusting one or more properties for communication during the one or more subframes responsive to the determination, wherein the one or more properties are distinct from the characteristics; and
   transmitting data during at least one of the one of more subframes, wherein the transmitting is distinct from the adjusting.

2. The method of claim 1, wherein determining the differences in characteristics comprises determining that a subframe of the set of subframes has one or more of:
   different available resource blocks (RBs) from the first subframe;
   a collision condition with one of: a primary synchronization signal, a secondary synchronization signal, a primary broadcast channel, a common reference signal, a positioning reference signal, or a channel state information reference signal;
   a subframe type different from a subframe type of the first subframe, the subframe type comprising one of: a multicast broadcast single frequency network (MBSFN) downlink subframe, a non-MBSFN subframe, a special subframe, or an almost blank subframe;
   a type indication that disallows physical downlink shared channel (PDSCH) or physical uplink shared channel (PUSCH) transmission; or
   a semi-persistent scheduling (SPS) assignment.

3. The method of claim 1, wherein adjusting one or more properties for communication during the one or more subframes comprises adjusting one or more of:
   a transport block size (TBS) of the one or more subframes relative to a transport block size of the first subframe;
   a modulation and coding scheme (MCS) of the one or more subframes relative to a MCS of the first subframe;
   a rank of the one or more subframes relative to a rank of the first subframe; or
   transmission resources based on a punctured demodulation reference signal (DM-RS) pattern.

4. The method of claim 1, wherein
   the determining comprises determining that a second subframe has a different number of available resource elements (REs) for transmission from the first subframe; and
   wherein the adjusting comprises adjusting a transport block size (TBS) of the second subframe based at least in part on the number of available REs of the second subframe.

5. The method of claim 1, wherein
the determining comprises determining that a number of available resource blocks (RBs) for a second subframe is different from a number of available RBs for the first subframe; and
wherein the adjusting comprises adjusting a resource allocation associated with the second subframe.

6. The method of claim 1, wherein
the determining comprises determining that a second subframe has a semi-persistently scheduled transmission; and
wherein the adjusting comprises skipping a scheduling of resources associated with the multi-subframe scheduling information for the second subframe.

7. The method of claim 1, further comprising:
receiving different scheduling information subsequent to receiving the multi-subframe scheduling information, the different scheduling information being for one of the set of subframes; and
replacing the multi-subframe scheduling information with the different scheduling information.

8. The method of claim 1, further comprising:
ignoring scheduling information for the set of subframes that is received after the receipt of the multi-subframe scheduling information.

9. A wireless communication user equipment apparatus, comprising:
a processor configured to:
receive, in a first subframe, multi-subframe scheduling information for a set of subframes;
determine differences in characteristics for one or more subframes of the set of subframes based on the multi-subframe scheduling information; and
adjust one or more properties for communication during the one or more subframes responsive to the determination, wherein the one or more properties are distinct from the characteristics; and
transmitting data during at least one of the one of more subframes, wherein the transmitting is distinct from the adjusting.

10. The apparatus of claim 9, wherein the processor is further configured to determine that a subframe of the set of subframes has one or more of:
different available resource blocks (RBs) from the first subframe;
a collision condition with one of: a primary synchronization signal, a secondary synchronization signal, a primary broadcast channel, a common reference signal, a positioning reference signal, or a channel state information reference signal;
a subframe type different from a subframe type of the first subframe, the subframe type comprising one of a multicast broadcast single frequency network (MBSFN) downlink subframe, a non-MBSFN subframe, a special subframe, or an almost blank subframe;
a type indication that disallows physical downlink shared channel (PDSCH) or physical uplink shared channel (PUSCH) transmission; or
a semi-persistent scheduling (SPS) assignment.

11. The apparatus of claim 9, wherein the processor is further configured to adjust one or more of:
a transport block size (TBS) of the one or more subframes relative to a transport block size of the first subframe;
a modulation and coding scheme (MCS) of the one or more subframes relative to a MCS of the first subframe;
a rank of the one or more subframes relative to a rank of the first subframe; or
transmission resources based on a punctured demodulation reference signal (DM-RS) pattern.

12. The apparatus of claim 9, wherein the processor is further configured to:
determine that a second subframe has a different number of available resource elements (REs) for transmission from the first subframe; and
adjust a transport block size (TBS) of the second subframe based at least in part on the number of available REs of the second subframe.

13. The apparatus of claim 9, wherein the processor is further configured to:
determine that a number of available resource blocks (RBs) for a second subframe is different from a number of available RBs for the first subframe; and
adjust a resource allocation associated with the second subframe.

14. The apparatus of claim 9, wherein the processor is further configured to:
determine that a second subframe has a semi-persistently scheduled transmission; and
skip a scheduling of resources associated with the multi-subframe scheduling information for the second subframe.

15. The apparatus of claim 9, wherein the processor is further configured to:
receive different scheduling information subsequent to receiving the multi-subframe scheduling information, the different scheduling information being for one of the set of subframes; and
replace the multi-subframe scheduling information with the different scheduling information.

16. The apparatus of claim 9, wherein the processor is further configured to ignore scheduling information for the set of subframes that is received after the receipt of the multi-subframe scheduling information.

17. A non-transitory computer-readable medium for wireless communication by a user equipment, the non-transitory computer-readable medium comprising code for:
receiving, in a first subframe, multi-subframe scheduling information for a set of subframes;
determining differences in characteristics for one or more subframes of the set of subframes based on the multi-subframe scheduling information; and
adjusting one or more properties for communication during the one or more subframes responsive to the determination, wherein the one or more properties are distinct from the characteristics; and
transmitting data during at least one of the one of more subframes, wherein the transmitting is distinct from the adjusting.

18. The computer-readable medium of claim 17, wherein the code for determining the differences in characteristics comprises code for determining that a subframe of the set of subframes has one or more of:
different available resource blocks (RBs) from the first subframe;
a collision condition with one of: a primary synchronization signal, a secondary synchronization signal, a primary broadcast channel, a common reference signal, a positioning reference signal, or a channel state information reference signal;
a subframe type different from a subframe type of the first subframe, the subframe type comprising one of: a multicast broadcast single frequency network (MBSFN) downlink subframe, a non-MBSFN subframe, a special subframe, or an almost blank subframe;

a type indication that disallows physical downlink shared channel (PDSCH) or physical uplink shared channel (PUSCH) transmission; or a semi-persistent scheduling (SPS) assignment.

19. The computer-readable medium of claim 17, wherein the code for adjusting one or more properties for communication during the one or more subframes comprises code for adjusting one or more of:

a transport block size (TBS) of the one or more subframes relative to a transport block size of the first subframe;

a modulation and coding scheme (MCS) of the one or more subframes relative to a MCS of the first subframe;

a rank of the one or more subframes relative to a rank of the first subframe; or transmission resources based on a punctured demodulation reference signal (DM-RS) pattern.

20. The computer-readable medium of claim 17, wherein the code for determining the differences in characteristics comprises code for determining that a second subframe has a different number of available resource elements (REs) for transmission from the first subframe; and wherein the adjusting comprises adjusting a transport block size (TBS) of the second subframe based at least in part on the number of available REs of the second subframe.

21. The computer-readable medium of claim 17, wherein the code for determining the differences in characteristics comprises code for determining that a number of available resource blocks (RBs) for a second subframe is different from a number of available RBs for the first subframe; and wherein the code for adjusting comprises code for adjusting a resource allocation associated with the second subframe.

22. The computer-readable medium of claim 17, wherein the code for determining the differences in characteristics comprises code for determining that a second subframe has a semi-persistently scheduled transmission; and wherein the code for adjusting comprises code for skipping a scheduling of resources associated with the multi-subframe scheduling information for the second subframe.

23. The computer-readable medium of claim 17 further comprises code for:

receiving different scheduling information subsequent to receiving the multi-subframe scheduling information, the different scheduling information being for one of the set of subframes; and replacing the multi-subframe scheduling information with the different scheduling information.

24. A method of wireless communication performed by a node in communication with a user equipment (UE), comprising:

determining differences in characteristics for one or more subframes of a set of subframes associated with a multi-subframe scheduling assignment;

adjusting multi-subframe scheduling information for the set of subframes based on the differences;

receiving data during at least one of the one of more subframes, wherein the receiving is distinct from the adjusting; and transmitting the multi-subframe scheduling information to a UE.

25. The method of claim 24, wherein determining the differences in characteristics comprises determining that a subframe of the set of subframes has one or more of:

different available resource blocks (RBs) from the first subframe;

a collision condition with a primary synchronization signal, a secondary synchronization signal, a primary broadcast channel, a common reference signal, a positioning reference signal, or a channel state information reference signal;

a subframe type that is different from a subframe type of the first subframe, the subframe type comprising one of: a multicast broadcast single frequency network (MBSFN) downlink subframe, a non-MBSFN subframe, a special subframe, or an almost blank subframe;

a type indication that disallows physical downlink shared channel (PDSCH) or physical uplink shared channel (PUSCH) transmission; or a semi-persistent scheduling (SPS) assignment.

26. The method of claim 24, wherein adjusting scheduling information for the one or more subframes of the set of subframes comprises adjusting one or more of:

a transport block size (TBS) of the one or more subframes relative to a transport block size of the first subframe;

a modulation and coding scheme (MCS) of the one or more subframes relative to a MCS of the first subframe;

a rank of the one or more subframes relative to a rank of the first subframe; or transmission resources based on a punctured demodulation reference signal (DM-RS) pattern.

27. The method of claim 24, wherein the determining comprises identifying one of the set of subframes having a different number of available resource elements from other subframes of the set of subframes; and wherein the adjusting comprises adjusting a transport block size (TBS) of the identified subframe based at least in part on a number of available resource elements of the identified subframe.

28. The method of claim 24, wherein the determining comprises identifying that a number of available resource blocks (RBs) for one of the set of subframes is different from a number of available RBs for one or more other subframes of the set of subframes; and wherein the adjusting comprises adjusting a resource allocation associated with the identified subframe.

29. The method of claim 24, wherein the determining comprises identifying one or more subframes of the set of subframes having a semi-persistently scheduled transmission; and wherein the adjusting comprises skipping a scheduling of resources associated with the multi-subframe scheduling information for the one or more identified subframes.

30. The method of claim 24, wherein the determining comprises identifying one or more subframes of the set of subframes having a semi-persistently scheduled transmission; and wherein the adjusting comprises skipping the semi-persistently scheduled transmission and scheduling resources associated with the multi-subframe scheduling information for the one or more identified subframes.

* * * * *